(12) United States Patent
Sissom et al.

(10) Patent No.: US 7,532,374 B2
(45) Date of Patent: May 12, 2009

(54) SHIFT TOLERANT LENS OPTIMIZED FOR PHASE CONJUGATING HOLOGRAPHIC SYSTEMS

(75) Inventors: Bradley J. Sissom, Boulder, CO (US); Alan Hoskins, Golden, CO (US); Apostolos Deslis, Superior, CO (US); Ernest Chuang, Louisville, CO (US); Bernard Bell, Lafayette, CO (US)

(73) Assignees: Inphase Technologies, Inc., Longmont, CO (US); Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/846,221

(22) Filed: Aug. 28, 2007

(65) Prior Publication Data

US 2008/0049283 A1    Feb. 28, 2008

Related U.S. Application Data

(60) Provisional application No. 60/840,458, filed on Aug. 28, 2006.

(51) Int. Cl.
G03H 1/16 (2006.01)

(52) U.S. Cl. ......................................................... 359/29

(58) Field of Classification Search ................... 359/29, 359/22, 24, 25
See application file for complete search history.

(56) References Cited

U.S. PATENT DOCUMENTS

| | | | |
|---|---|---|---|
| 5,082,337 A | 1/1992 | Chern et al. | |
| 5,898,544 A | 4/1999 | Krinke et al. | |
| 5,959,281 A | 9/1999 | Domiteaux | |
| 6,103,454 A | 8/2000 | Dhar et al. | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,765,061 B2 | 7/2004 | Dhar et al. | |
| 6,780,546 B2 | 8/2004 | Trentler et al. | |
| 6,801,260 B1 | 10/2004 | Veksland et al. | |
| 6,972,885 B2 | 12/2005 | Hiley et al. | |
| 7,123,416 B1 | 10/2006 | Erdogan et al. | |
| 7,411,708 B2 * | 8/2008 | Waldman et al. | 359/29 |
| 2002/0162939 A1 | 11/2002 | Heidrich | |
| 2002/0166893 A1 | 11/2002 | Li et al. | |
| 2002/0176181 A1 | 11/2002 | Jacobsen | |
| 2003/0034552 A1 | 2/2003 | Wada et al. | |
| 2003/0047608 A1 | 3/2003 | Huss et al. | |
| 2003/0206320 A1 | 11/2003 | Cole et al. | |
| 2004/0027625 A1 | 2/2004 | Trentler et al. | |
| 2004/0150872 A1 | 8/2004 | Neukermans et al. | |
| 2004/0213464 A1 | 10/2004 | Hanson et al. | |

(Continued)

OTHER PUBLICATIONS

PCT/US07/75176 International Search Report and the Written Opinion of the International Searching Authority, or the Declaration, mailed Apr. 3, 2008.

(Continued)

*Primary Examiner*—Alessandro Amari
(74) *Attorney, Agent, or Firm*—Jagtiani + Guttag

(57) ABSTRACT

A new type of FT lens is provided that improves phase conjugation in holographic data systems. This type of FT lens has a uniquely large isoplanatic patch. This enables relaxed assembly tolerances, asymmetric reader/writer architectures, and compensation for tilted plate aberrations in the media.

20 Claims, 24 Drawing Sheets

U.S. PATENT DOCUMENTS

| | | | |
|---|---|---|---|
| 2005/0270856 | A1 | 12/2005 | Earhart et al. |
| 2005/0286388 | A1 | 12/2005 | Ayres et al. |
| 2006/0006305 | A1 | 1/2006 | Fukai |
| 2006/0274391 | A1 | 12/2006 | Dickson et al. |
| 2006/0279821 | A1 | 12/2006 | Riley et al. |
| 2007/0091399 | A1 | 4/2007 | Ihas et al. |
| 2007/0127100 | A1 | 6/2007 | Wilson et al. |

OTHER PUBLICATIONS

PCT/US07/81378 International Search Report and the Written Opinion of the International Searching Authority, or the Declaration, mailed May 7, 2008.

PCT/US07/05636 International Search Report and the Written Opinion of the International Searching Authority, or the Declaration, mailed Mar. 13, 2008.

PCT/US07/77822 International Search Report and the Written Opinion of the International Searching Authority, or the Declaration, mailed Mar. 20, 2008.

Urey, et al. "Scanner Design and Resolution Tradeoffs for Miniature Scanning Displays," Conference on Flat Panel Display Tech & Display Metrology, Proceedings of SPIE, vol. 3636, pp. 60-68, 1999.

Hopkins, H.H. "Aberration Theory and Lens Design," Japanese J. Appl. Physics, vol. 4, Supplemental 1, pp. 31-35, 1965.

U.S. Appl. No. 11/840,410, filed Aug. 17, 2007, Curtis et al.

Anderson, K., et al., "Polytopic Multiplexing," Optic Letters, vol. 29, No. 12, pp. 1402-1404, Jun. 15, 2004.

Anderson, K., et al., "How to Write Good Books," Invited Talk, ODS Proceedings (2006).

Hoskins, A., et al., "Tolerances of a Page-Based Holographic Data Storage System," Invited Talk, ODS Proceedings (2007).

Goodman, J.W., "Introduction to Fourier Optics, $3^{rd}$ ed.," Roberts and Company (2005).

Longhurst, R.S., "Geometrical and Physical Optics" Longman (1957).

Smith, T., "Infinitesimal Translation of a Pencil in Object Space Produced an Infinitesimal Translation Without Change in Shape of the Corresponding Pencil in Image Space," Trans. Opt. London 24 (1922-1923), p. 31.

Welford, W.T., "Infinitesimal Rotation of a Pencil in Object Space Produces an Infinitesimal Rotation Without Change in Shape of the Corresponding Pencil in Image Space," Optics Comm. vol. 3, No. 1 (1971) pp. 1-6.

Welford, W.T., "Aberrations of Optical Systems," Adam Hilger Ltd (1986).

Smith, W., "Modern Optical Engineering $2^{nd}$ ed," McGraw-Hill Inc. (1990).

Wyant, J. et al., "Basic Wavefront Abberation Theory for Optical Metrology," Applied Optics and Optical Engineering vol. XI, Ch. 1 (1992).

PCT/US2008/060014 International Search Report and the Written Opinion of the International Searching Authority, or the Declaration, mailed Aug. 8, 2008.

PCT/US2007/076979 International Search Report and the Written Opinion of the International Searching Authority, or the Declaration, mailed Aug. 20, 2008.

PCT/US2007/005636 International Preliminary Report on Patentability (Chap. 1 of the Patent Cooperation Treaty) and the Written Opinion of the International Searching Authority, mailed Sep. 18, 2008.

\* cited by examiner

SHIFT TOLERANT LENS OPTIMIZED FOR PHASE CONJUGATING HOLOGRAPHIC SYSTEMS

CROSS-REFERENCE TO RELATED APPLICATIONS

This application claims the priority date of co-pending. Prov. App. No. 60/840,458, entitled "SHIFT TOLERANT LENS OPTIMIZED FOR PHASE CONJUGATING HOLOGRAPHIC SYSTEMS," filed Aug. 28, 2006 and the entire disclosure and contents of this provisional application is hereby incorporated by reference.

STATEMENT OF JOINT RESEARCH AGREEMENT

In compliance with 37 C.F.R. §1.71(g) (1), disclosure is herein made that the claimed invention was made pursuant to a Joint Research Agreement as defined in 35 U.S.C. 103 (c) (3), that was in effect on or before the date the claimed invention was made, and as a result of activities undertaken within the scope of the Joint Research Agreement, by or on the behalf of InPhase Technologies, Inc. and Nintendo Co., Ltd.

BACKGROUND

1. Field of the Invention

The present invention related to holographic data storage methods.

2. Related Art

Perhaps the most promising design for a holographic data storage system (HDS System) employs a page based architecture where the Fourier transform of a data page is interfered in the holographic media with a plane wave reference beam, see FIG. 1. Fourier Transformation is accomplished using a High NA Fourier Transform (FT) lens. High data density is achieved in the system through angle multiplexing and polytopic multiplexing, see K. Anderson, K. Curtis, "Polytopic multiplexing," Opt. Lett., 29, 1402-1404 (2004) and K. Anderson, et al, "How to write good books," Invited talk, ODS Proceedings (2006), the entire contents and disclosures of which are hereby incorporated by reference. While, mathematically, the Fourier Transform (FT) operation is shift invariant, this invariance is limited in real optical systems due to aberrations in the FT lens. This fact, coupled with the tilt and thermal requirements of high NA holographic storage systems in thick media can make media position tolerances and optical design difficult, see A. Hoskins, et al, "Tolerances of a Page-Based Holographic Data Storage System", Invited talk, ODS Proceedings (2007), the entire contents and disclosure of which is hereby incorporated by reference.

SUMMARY

According to a first broad aspect of the present invention, there is provided a holographic storage device or system comprising: a reference beam source for generating a reference beam; a data beam source for generating a data beam; and an extremely isoplanatic FT lens through which the data beam passes prior to the entering a holographic storage medium, wherein the reference beam and data beam interfere in the holographic storage medium to record one or more data pages in the holographic storage medium.

According to a second broad aspect of the invention, there is provided a method comprising the following steps:

(a) passing a data beam through an extremely isoplanatic FT lens to form a focused data beam; and (b) recording one or more data pages in a holographic storage medium by interfering the focused data beam with a reference beam.

According to a third broad aspect of the invention, there is provided a holographic storage recovery device or system comprising: a reconstruction beam source for generating a reconstruction beam that passes through a holographic storage medium to thereby form a recovered beam from one or more data pages stored in the holographic storage medium; an extremely isoplanatic FT lens through which the recovered beam passes; and a camera for detecting the recovered beam after the recovered beam has passed through the extremely isoplanatic FT lens.

According to a fourth broad aspect of the invention, there is provided a method comprising:

(a) passing a reconstruction beam through a holographic storage medium to thereby form a recovered beam from one or more data pages stored in the holographic storage medium; and (b) detecting the recovered beam after the recovered beam has passed through an extremely isoplanatic FT lens.

According to a fifth broad aspect of the invention, there is provided an article comprising: a holographic storage medium having one or more data pages stored therein, wherein the holographic storage medium has hot spots of lesser volume and irradiance than the holographic storage medium would have if the one or more data pages were stored using a conventional, diffraction limited, on-axis FT lens.

BRIEF DESCRIPTION OF THE DRAWINGS

The invention will be described in conjunction with the accompanying drawings, in which.

DETAILED DESCRIPTION

Figure 1:
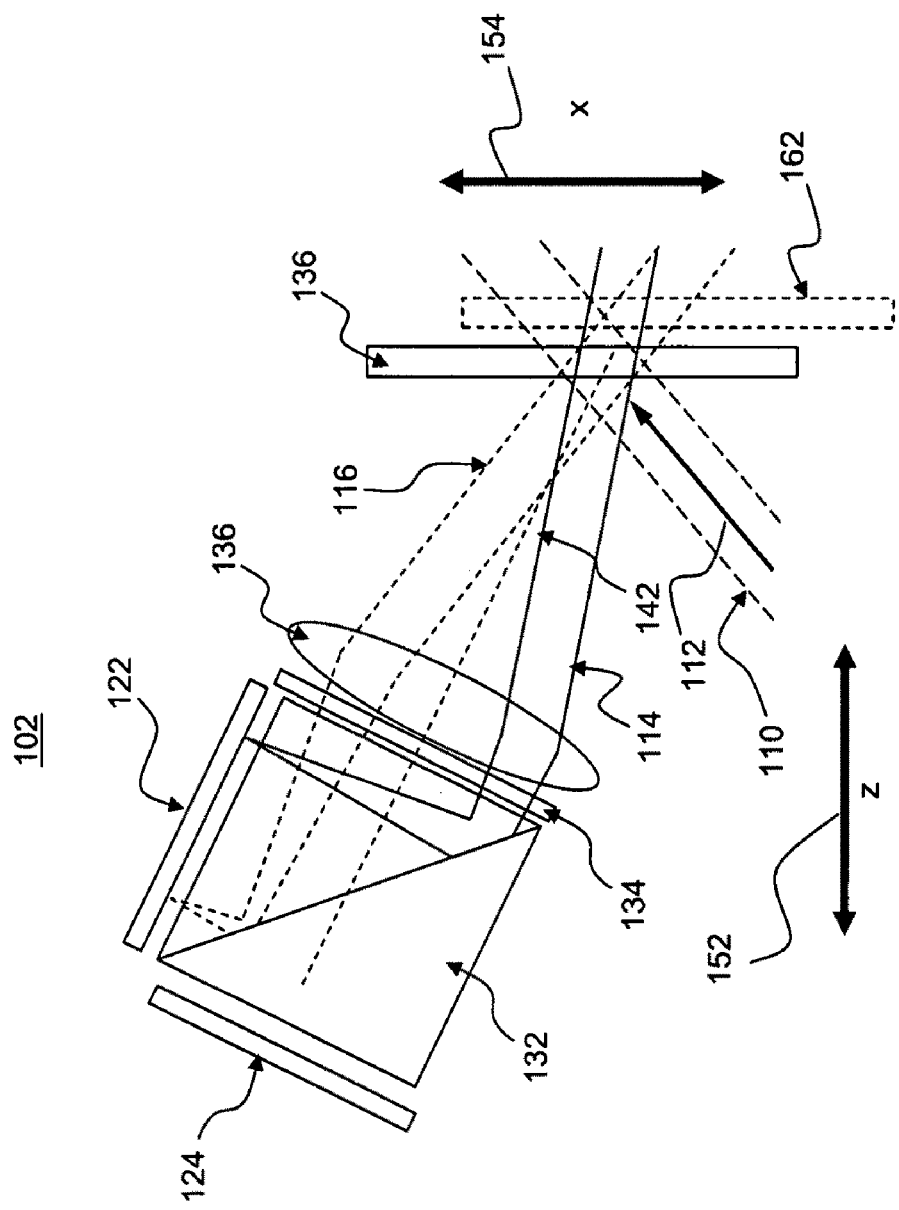
FIG. 1 is schematic drawing of a page based holographic data storage system using a High NA FT lens to store the data page in holographic media.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", etc. are merely used for convenience in describing the various embodiments of the present invention. The embodiments of the present invention may be oriented in various ways. For example, the embodiments shown in FIGS. 6, 7, 12 and 13 may be flipped over, rotated by 90° in any direction, etc.

For the purposes of the present invention, the terms "z-direction" refers to the direction perpendicular to the surface of a holographic storage medium during recording of one or more data pages in the holographic storage medium. The x-direction and y-direction are parallel to the surface of the holographic storage medium during recording and are perpendicular to the z-direction and to each other.

For the purposes of the present invention, the terms "x-shift," "y-shift" and "z-shift" refer to translational shifts of the holographic storage medium relative to the FT lens in the x, y and z directions, respectively, between recording data pages in a holographic storage medium and recovering the one or more stored data pages from the holographic storage medium. A z-shift refers to the FT lens used in the recovery process being closing or farther away from the holographic storage medium than the FT lens used in storing the data pages in the holographic storage medium. A z-shift refers to the FT lens used in the recovery process being closing or farther away from the holographic storage medium than the FT lens used in storing the data pages in the holographic storage medium. An x-shift or y-shift refers to a translational shift of the optical axis of the FT lens relative to the holographic storage medium between the recording process and the recovery process. The FT lens used in the recording and recovery processes may be the same or different.

For the purposes of the present invention, the term "beam block" refers to any device capable of absorbing light, such as, for example, an incident light beam.

For the purposes of the present invention, the term "book" or "stack" refers to a group of angular multiplexed holograms that span a particular angular range. A book is a group of angular multiplexed holograms that may be all in one location in the holographic storage medium or slightly shifted from one another or shifted from another group of holograms. The term book refers to both traditional books and composite books.

For the purposes of the present invention, the terms "book width" and "book spacing" refers to the minimum spacing in a holographic storage medium to avoid simultaneous readout of holograms in neighboring books. Examples of "book widths" and "book spacing" are is described and shown in U.S. Pat. App. 2007/0127100 (Wilson et al.), entitled "SHORT STACK RECORDING IN HOLOGRAPHIC MEMORY SYSTEMS," published Jun. 7, 2007 and U.S. Pat. App. 2005/02709856 (Earhart. et al.), entitled "MULTI-LEVEL FORMAT FOR INFORMATION STORAGE," published Dec. 8, 2005, and the entire contents and disclosures of these applications is hereby incorporated by reference.

For the purposes of the present invention, the term "coherent light beam" refers to a beam of light including waves with a particular (e.g., constant) phase relationship, such as, for example, a laser beam. A coherent light beam may also be referred to as light in which the phases of all electromagnetic waves at each point on a line normal to the direction of the light beam are identical.

For the purposes of the present invention, the term "composite book" refers to a book where at least some of the short stacks of the book do not occupy the same spatial location. In fact, it may be useful to "smear" out any optically induced distortions by placing short stacks in different spatial locations. In a composite book, the spatial locations of the short stacks may partially overlap one another, but differ enough spatially to mitigate any non-ideal media buildup due to multiple recordings in the same location.

Figure 2:
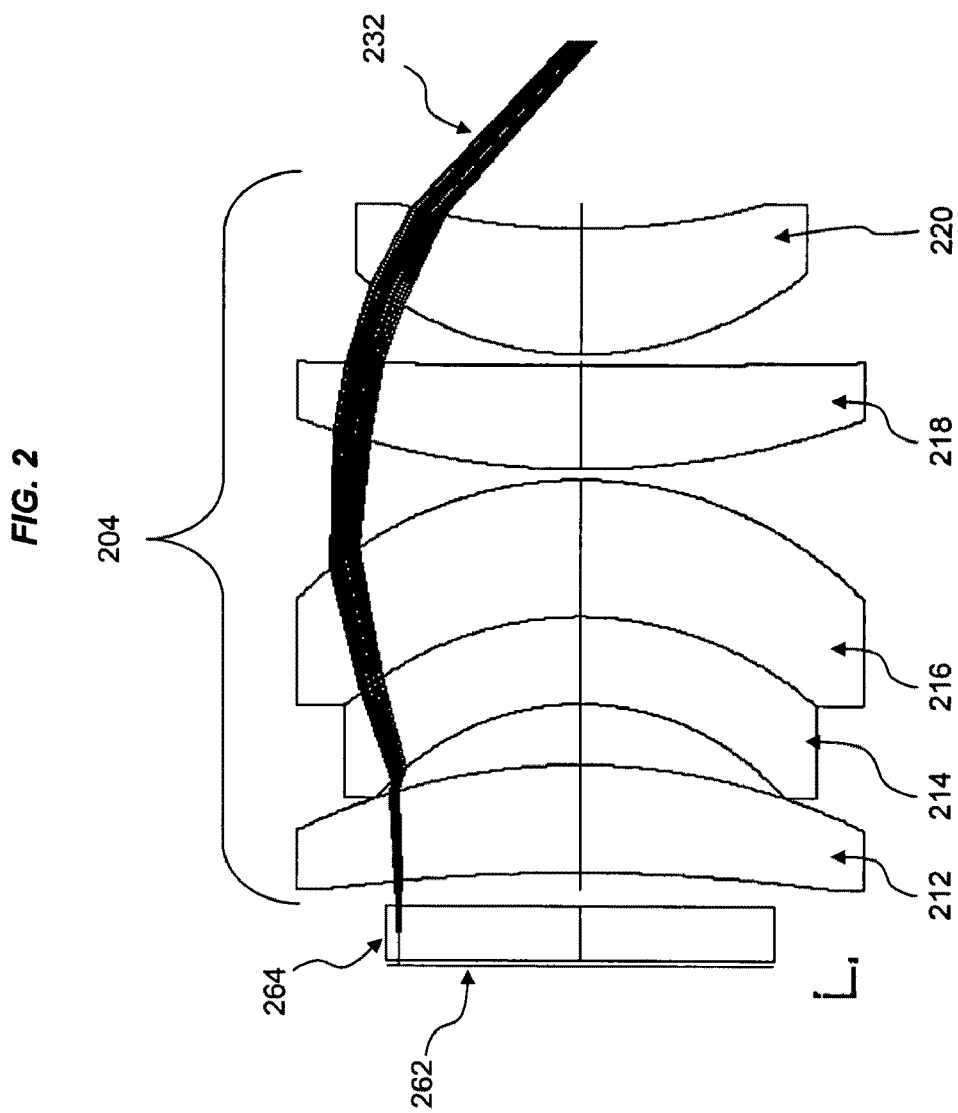
FIG. 2 is a schematic illustration of an extremely isoplanatic FT lens.

For the purposes of the present invention, the term "composite lens" refers to a lens made up of several other lenses/lens elements. For example, the extremely isoplanatic FT lens of FIG. 2 is a composite lens.

For the purposes of the present invention, the term "data beam" refers to a beam containing a data signal. For example, a data beam may include beams that have been modulated by a modulator such as a spatial light modulator (SLM), along with a beam generated in response to a reference beam impingent on a holographic storage medium, where the generated beam includes data. The modulation of the data beam may be an amplitude modulation, a phase modulation or some combination of the amplitude and phase modulation. The SLM may be reflective or transmissive. The data beam may be modulated into a binary state or into a plurality of states.

For the purposes of the present invention, the term "data modulated beam" refers to a data beam that has been modulated by a modulator such as a spatial light modulator (SLM). The modulation of the data beam may be an amplitude modulation, a phase modulation or some combination of amplitude and phase modulation. The SLM may be reflective or transmissive. The data beam may be modulated into a binary state or into a plurality of states.

For the purposes of the present invention, the term "data modulator" refers to any device that is capable of optically representing data in one or two-dimensions from a signal beam.

For the purposes of the present invention, the term "data page" or "page" refers to the conventional meaning of data page as used with respect to holography. For example, a data page may be a page of data (i.e., a two-dimensional assembly of data), one or more pictures, etc., to be recorded or recorded in a holographic storage medium.

For the purposes of the present invention, the term "decentered" refers to a composite lens having one or more lens elements that are not on-axis with the other lens elements of the composite lens, also referred to as an off-axis lens.

For the purposes of the present invention, the term "detector" refers to any type of device capable of detecting something. For example, exemplary detectors may include devices capable of detecting the presence or irradiance of light, such as for example, a camera or quad cell, complementary metal-oxide-semiconductor (CMOS) imaging sensors or arrays, charge-coupled device (CCD) arrays, etc.

For the purposes of the present invention, the term "device" may refer to an apparatus, a mechanism, equipment, machine, etc.

For the purposes of the present invention, the term "disk" refers to a disk-shaped holographic storage medium.

For the purposes of the present invention, the term "dithering" refers to moving an object, for example, a lens, mirror, reflective layer, etc., back and forth.

For the purposes of the present invention, the term "dynamic range" or "M#" of a material refers to a conventional measure of how many holograms at a particular diffraction efficiency may be multiplexed at a given location in the material (e.g., recording material layer, holographic storage medium, etc.) and is related to the materials index change, material thickness, wavelength of light, optical geometry, etc.

For the purposes of the present invention, the term "extremely isoplanatic patch" refers to an area of the lens' field, where wavefront error is invariant. This area must be much greater than the area of the lenses point spread function to be considered extremely isoplanatic.

For the purposes of the present invention, the term "high NA system" refers to as system utilizing an FT lens with a numerical aperture (NA) greater than 0.3 but typically greater 0.5 or more.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded page-wise, the signal beam may be encoded with a data modulator, e.g., a spatial light modulator, etc.

For the purposes of the present invention, the term "holographic storage device or system" refers to a device or system which may record (store) holographic data, which may read (recover) holographic data, or which may record (store) and read (recover) holographic data.

For the purposes of the present invention, the term "holographic storage medium" refers to medium that has a least one component, material, layer, etc., that is capable of recording and storing one or more holograms (e.g., bit-wise, linear array-wise or page-wise) as one or more patterns of varying refractive index imprinted into the medium. Examples of a holographic medium useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003/0206320 (Cole et al.) published Nov. 6, 2003; and U.S. Patent Application No. 2004/0027625 (Trentler et al.), published Feb. 12, 2004, the entire contents and disclosures of which are herein incorporated by reference. A holographic storage medium of the present invention may be any type of holographic storage medium including: a transparent holographic storage medium, a holographic storage medium including a plurality of components or layers such as a reflective layer, a holographic storage medium including a reflective layer and a polarizing layer so reflection may be controlled with polarization, a holographic storage medium including a variable beam transmission layer that may be pass, absorb, reflect, be transparent to, etc., light beams, grating layers for reflecting light beams, substrates, substrates with servo markings, etc.

For the purposes of the present invention, the term "holographic recording" refers to the act of recording a hologram in a holographic storage medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "isoplanatic patch" refers to an area of the lens' field, where wavefront error is invariant.

For the purposes of the present invention, the term "extremely isoplanatic lens" refers to a lens where the wavefront is invariant across the field of the lens. The point spread function of an isoplanatic lens is on the order of a micron or two. In contrast, the point spread function of an extremely isoplanatic lens is much greater than 1 um, for example 50 µm to several millimeters. The definition of an extremely isoplanatic lens is also elaborated in greater detail below.

For the purposes of the present invention, the term "lens element" refers to one of the lens elements that make up a composite lens.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "mode" refers to a wavelength of light generated by a light source.

For the purposes of the present invention, the term "multi-mode" refers to multiple wavelengths of light generated by the light source. For example, a multi-mode laser produces multiple wavelengths of light with significant power.

For the purposes of the present invention, the term "multiplexing" refers to recording, storing, etc., a plurality of holograms in the same volume or nearly the same volume of the holographic storage medium by varying a recording parameter(s) including, but not limited to, angle, wavelength, phase code, shift, correlation, peristrophic, etc., including combinations of parameters, e.g. angle-polytopic multiplexing For example, angle multiplexing involves varying the angle of the plane wave or nearly plane wave of the reference beam during recording to store a plurality of holograms in the same volume. The multiplexed holograms that are recorded, stored, etc., may be read, retrieved, reconstructed, recovered, etc., by using the same recording parameter(s) used to record, store, etc., the respective holograms.

For the purposes of the present invention, the term "on-axis FT lens" refers to an FT lens where all of the lens elements are on axis. For example, an FT lens having lens that are all concentric is an on-axis FT lens.

For the purposes of the present invention, the term "optical steering subsystem" refers to any device or combination of devices capable of directing light in a particular direction. Exemplary optical steering subsystems may include a mirror (e.g., a galvo mirror), a combination of mirrors, lenses, and/or other devices, etc.

For the purposes of the present invention, the term "partially reflective surface" refers to any surface of an object capable of reflecting a portion of light while allowing another portion to pass through the surface.

For the purposes of the present invention, the term "phase conjugate" when referring to a light beam refers to a light beam which is an exact or very close replica of a second light beam, but propagating exactly or very closely in the reverse direction of the second light beam.

For the purposes of the present invention, the term "phase conjugate optical system" refers to any device that causes a reference beam (also referred to as a "reconstruction beam" when used for data recovery) of a holographic storage device or system to be reflected (directed) back along the path of the reference (reconstruction) beam in the opposition direction. Examples of phase conjugate optical systems may include a corner cube, a corner cube array, a controlled electro-optic (EO) crystal, a controlled blazed grating, a holographic grating, surface relief structure, and the combination of a variable layer and a grating (whether a holographic grating or surface relief structure).

For the purposes of the present invention, a "phase conjugating system" is a holographic storage and/or readout system employing a phase conjugate optical system.

For the purposes of the present invention, the term "plane wave" refers to a constant-frequency wave whose wavefronts (surfaces of constant phase) are substantially or nearly parallel planes of constant amplitude and normal to the direction of the wave and exist in a localized region of space. Exemplary plane waves may include collimated light such as those associated with laser beams for laser pointers, etc.

For the purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For the purposes of the present invention, the term "reading data" refers to retrieving, recovering, or reconstructing holographic data stored in a holographic storage medium.

For the purposes of the present invention, the term "recording data" refers to storing or writing holographic data into a holographic storage medium.

For the purposes of the present invention, the term "recording light" refers to a light source used to record information, data, etc., into a holographic storage medium.

For the purposes of the present invention, the term "recovered beam" refers to a beam generated by the reference (reconstruction) beam which is provided by the phase conjugate optical system. The phase conjugate of the reference (reconstruction) beam will reconstruct the phase conjugate of the data beam which propagates backwards along the original data beam's optical path to be recovered as a data page by a detector (e.g., camera). The recovered beam is formed by the phase conjugate reference (reconstruction) beam diffracting from a hologram of a data page stored in the holographic storage medium. For example, with angle multiplexed holograms, for a given angle a certain data page will be Bragg matched and the phase conjugate reference (reconstruction) beam will diffract and form the recovered beam. Since the phase conjugate reference (reconstruction) beam is used at that correct angle and wavelength (Bragg condition), the desired data page will be reconstructed as a phase conjugate beam which propagates back to where the data beam originated from. The phase conjugate nature allows the recovered beam to undo aberrations that may have been introduced during recording of the holograms and to form a higher quality data page at the detector. This happens if the hologram and reference (reconstruction) beam are within tolerance of being phase conjugate of the original reference beam and relative location to similar optics. For some optical designs, these tolerances may be multiple waves of aberration in the phase conjugate reference (reconstruction) plane wave and many tens of microns in relative position of the hologram and optical system. The reference (reconstruction) beam may also Bragg match out a traditional hologram, but will propagate out of the optical system (i.e., not back to the detector/SLM).

For the purposes of the present invention, the term "reference beam" refers to a beam of light not modulated with data. Exemplary reference beams include non-data bearing laser beams used while recording data to, or reading data from a holographic storage medium. In some embodiments, the reference beam may refer to the original reference beam used to record the hologram, to a reconstruction beam when used to recover data from the holographic storage medium, or to the phase conjugate of the original reference (reconstruction) beam.

For the purposes of the present invention, the term "refractive index profile" refers to a three-dimensional (X, Y, Z) mapping of the refractive index pattern recorded in a holographic storage medium.

For the purposes of the present invention, the term "shift tolerant" refers to an FT lens in which SnR losses are mitigated if holographic storage medium undergoes a shift and any of the three translation directions (x, y, z) and/or any of the three rotational directions. SNR losses are considered mitigated if there is less than half of a 0.5 db loss or less of SNR when a holographic storage medium is shifted by a total of half a book width or less in all three translational directions i.e. the vector sum of all of the translational shifts is half a book width or less. SNR losses are also mitigated if there is less than half of a db loss or less of SNR when a holographic storage medium is rotated by a total of 20% of the system NA or less in all three rotational directions i.e. the vector sum of all of the rotational shifts is 20% of the system NA or less. The "system NA" refers to the NA of the FT lens.

For the purposes of the present invention, the term "short stack" refers to sub-group of holograms within the address range of a book. For example, a book may be considered as a set of addresses that contain angles 1-500. This angular range may be further separated into "short stacks" so that short stack #1 contains angles 1-100, short stack #2 contains angles 101-200, etc.

For the purposes of the present invention, the term "single mode" refers to a single wavelength of light generated by a light source. For example, a single mode laser produces a single dominant wavelength.

For the purposes of the present invention, the term "spatial light modulator" (SLM) refers to a device that stores information on a light beam by, for example, modulating the spatial irradiance and/or phase profile of the light beam.

For the purposes of the present invention, the term "spatial light irradiance" refers to a light irradiance distribution or pattern of varying light irradiance within a given volume of space.

For the purposes of the present invention, the term "storage medium" refers to any component, material, etc., capable of storing information, such as, for example, a holographic storage medium.

For the purposes of the present invention, the term "telecentric" refers to the chief rays being perpendicular to object or image. This means the pupil is at infinity and all pixels subtend the same solid angle. The subtending of the identical solid angle is known in the field as cos^4 correction.

For the purposes of the present invention, the term "upper surface" refers to the surface of the holographic storage medium that acts as an interface between the air and the holographic storage medium.

For the purposes of the present invention, the term "waveplate" refers to any device that may be used to change the polarization of light. A waveplate is also sometimes referred to as a retarder and the terms may be used interchangeably herein. Exemplary waveplates include a λ/4 waveplate (QWP) that may be used, for example, to cause a ¼ wavelength phase shift in a light beam that may result in changing linearly polarized light to circular and vice versa. Further, for example, a light beam twice passing through a λ/4 waveplate may undergo a 90 degree rotation in the linear polarization of the light.

Description

The shift tolerant lens of the present invention may be used in phase conjugating holographic systems including the phase conjugating holographic systems described in U.S. patent application Ser. No. 11/840,410, entitled "MONOCULAR HOLOGRAPHIC DATA STORAGE SYSTEM ARCHITECTURE," filed Aug. 17, 2007 (Curtis et al.), the entire contents and disclosure of which is hereby incorporated by reference.

FIG. 1 illustrates a page based holographic storage system 102 where the Fourier transform of a data page is interfered in the holographic media with a plane wave reference beam. System 102 includes a reference beam 110 that travels in a direction shown by arrow 112, a data beam represented by an inner pixel wave front 114 (hereafter referred to as inner data beam portion 114) and an outer pixel wave front 116 (hereafter referred to as outer data beam portion 116), a spatial light modulator (SLM) 122, a camera 124, a polarizing beam splitter (PBS) 132, a filter λ/2 plate 134, a high numerical aperture (NA) lens 136 and a holographic storage medium 138. Lens 136 is an objective lens and has an optical axis 142. The z-direction is shown by double-headed arrow 152. The x-direction, indicated by double-headed arrow 154 and y-direction (not shown in FIG. 1) are perpendicular to each other and to the z-direction. A combination x-shift and z-shift of holographic storage medium 138 is shown by arrow 162.

With typical diffraction limited FT lenses, z-shifts may defeat phase conjugation due to wavefront shift. Wavefront error (WFE) at the camera declines rapidly with z-shift. The extremely isoplanatic lenses of the present invention enable phase conjugation to be employed in a holographic recovery process, even though the holographic storage medium, as well as the data pages being recovered, are shifted in the x-, y-and/or z-directions or rotated in any direction.

An extremely isoplanatic FT lens of the present invention may have great applicability in holographic data storage, particularly for high NA systems. An extremely isoplanatic FT lens of the present invention may be tolerant of x-shifts, y-shifts and z shifts. Extremely isoplanatic FT lenses of the present invention require few optical degrees of freedom than a diffraction limited lens, and therefore, may be made with fewer elements and may have a shorter overall length. An extremely isoplanatic lens of the present invention may provide a relaxed placement tolerance of the polytopic filter in a holographic recovery and/or storage system of the present invention. An extremely isoplanatic lens of the present invention may have much better distortion than a diffraction limited lens in the presence of hologram/holographic storage medium shift. An extremely isoplanatic lens of the present invention may be able to keep the solid angle subtended by the exit pupil for each SLM or Camera pixel constant, even for non-telecentric systems that are not inherently cos^4 corrected.

The lenses of the present invention exploit the principle of isoplanatism or space invariance. This means the aberrations associated with the point spread function of a lens do not vary across the field of the lens, see W. T. Welford, "Aberrations of Optical Systems, Adam Hilger Ltd (1986), the entire contents and disclosure of which is hereby incorporated by reference. Limited isoplanatism of tiny "isoplanatic patches" is required to linearize the response of any lens so that it performs a fourier transform, see Joseph W. Goodman, "Introduction to Fourier Optics, 3rd ed.", Roberts & Company (2005), the entire contents and disclosure of which is hereby incorporated by reference. Typically the size of an "isoplanatic patch" in such an FT lens is slightly greater than the size of the point spread function (psf) see R. S. Longhurst, "Geometrical and Physical Optics:, Longman (1957), the entire contents and disclosure of which is hereby incorporated by reference, or a few microns square. The lenses of the present invention have isoplanatic patches several millimeters square and are thus said to be extremely isoplanatic.

Extreme isoplanatism is a FT lens property that makes holographic phase conjugation more robust. The larger the "isoplanatic patch", the more an FT lens can shift with respect to a recorded hologram and phase conjugate perfectly or nearly perfectly. Extreme isoplanatism enables a number of improvements in holographic data storage systems: (1) media position tolerances are greatly relaxed, (2) FT lens assembly tolerances are greatly relaxed and interchangeability of media between systems is improved, (3) tilted plate aberrations, such as coma and spherical aberration inside the storage medium, that cause coherent hot spots may be corrected, by reducing the volume and irradiance of hotspots (4) distortion (pincushioning barrel, keystone) from medium shifts is minimized, and (5) asymmetric systems where recording FT lens and readout FT lens are completely different become possible.

In some embodiments of the present invention, using an extremely isoplanatic FT lens to store data pages in a holographic storage medium may reduce the total volume of hot spots in a holographic storage medium by about 20% to about 100 times and typically by about 5 times. In some embodiments of the present invention, using an extremely isoplanatic FT lens to store data pages in a holographic storage medium may reduce the total irradiance of hot spots in a holographic storage medium by about 1.5 to 500 times and typically by about 15 times.

Several definitions of "infinitesimal" isoplanatism appear in the literature. They include:

(1) infinitesimal translation of a pencil in object space produces an infinitesimal translation without change in shape of the corresponding pencil in image space, see T.

Smith, Trans. Opt. Soc. London 24 (1922-1923), p. 31, the entire contents and disclosure of which is hereby incorporated by reference;

(2) infinitesimal rotation of a pencil in object space produces an infinitesimal rotation without change in shape of the corresponding pencil in image space, see W. T. Welford, Optics Communications Vol. 3 Num. 1 (1971), pp. 1-6, the entire contents and disclosure of which is hereby incorporated by reference;

(3) constancy of wavefront aberration at a given point in the pupil, H. H. Hopkins, Japan. J. Appl. Phys. 4 (1965) Suppl. 1. p. 31, the entire contents and disclosure of which is hereby incorporated by reference;

(4) constancy of wavefront aberration corresponding to a given PSF in image space, see W. T. Welford, "Aberrations of Optical Systems, Adam Hilger Ltd (1986), the entire contents and disclosure of which is hereby incorporated by reference; and (5) aplanatic systems, by definition, exhibit infinitesimal isoplanatism because they have zero wavefront aberration at a given point. i.e. wavefront is a plane wave for all field points.

An important performance metric in page based holographic data storage is signal to noise ratio (SNR). SNR is largely a function of the FT lens readout PSF. Therefore, for the purposes of the present invention, the term "extreme isoplanatism" refers to a phase conjugating FT lens that has a substantially constant SNR in the presence of finite shifts and tilts. Effectively, this definition of "extreme isoplanatism" alters the definitions of "infinitesimal isoplanatism" above by allowing the rotations and translations to be "finite" instead of being limited to infinitesimal rotations and translation and allowing the wavefront aberrations to be at an extreme isoplanatic patch instead of being limited to a point or infinitesimal isoplanatic patch. Extremely isoplanatic patches can be orders of magnitude bigger in area than the infinitesimal isoplanatic patch associated with a point spread function.

These above definitions, once modified to cover extreme isoplanatism can be used as design time constraints when optimizing a lens with a modern lens design program, see W. Smith, "Modern Optical Engineering $2^{nd}$ ed.", McGraw-Hill Inc. (1990), the entire contents and disclosure of which is hereby incorporated by reference. The lenses presented here were optimized in that manner.

FIG. 2 shows an extremely isoplanatic FT lens 204 made up of lens elements 212, 214, 216, 218 and 220. FT lens 202 is optimized for isoplanatism by constraining the lens performance. A wavefront 232 originates at an SLM 262 and passes through a filter λ/2 plate 264 prior to passing through FT lens 202. Wavefront 232 corresponds to a single pixel at 1.5 mm field. By examining changes in wavefront vs. field, see definition. 3 of isoplanatism above, it is possible to directly examine the size of this FT lens' isoplanatic patch. One means of doing this is to examine changes in Zernike polynomial coefficients, see J. Wyant., K Creath, "Basic Wavefront Aberration Theory for Optical Metrology", Applied Optics and Optical Engineering Vol. XI, Ch 1, the entire contents of disclosure of which is hereby incorporated by reference, and RMS wavefront error. The relationship between Zernike coefficients and wavefront is given in equation 1 below.

$$W(\rho, \theta') = \quad (1)$$
$$Z_0 + Z_1\rho\cos\theta' + Z_2\rho\sin\theta' + Z_3(2\rho^2 - 1) + Z_4\rho^2\cos2\theta' + Z_5\rho^2\sin2\theta' +$$

-continued
$$Z_6(3\rho^2 - 2)\rho\cos\theta' + Z_7(3\rho^2 - 2)\rho\sin\theta' + Z_8(6\rho^4 - 6\rho^2 + 1).$$

Figure 3:
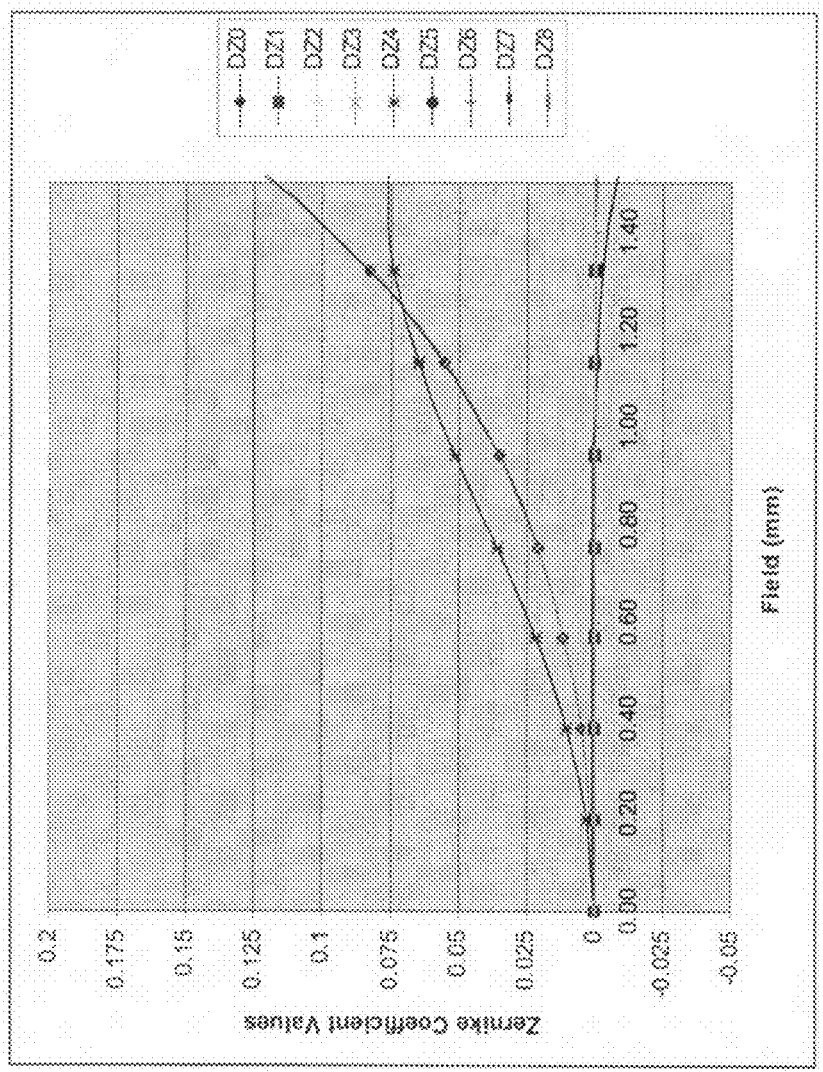
FIG. 3 is a graph of Zernike Coefficients vs. Field for an FT lens.
Figure 4:
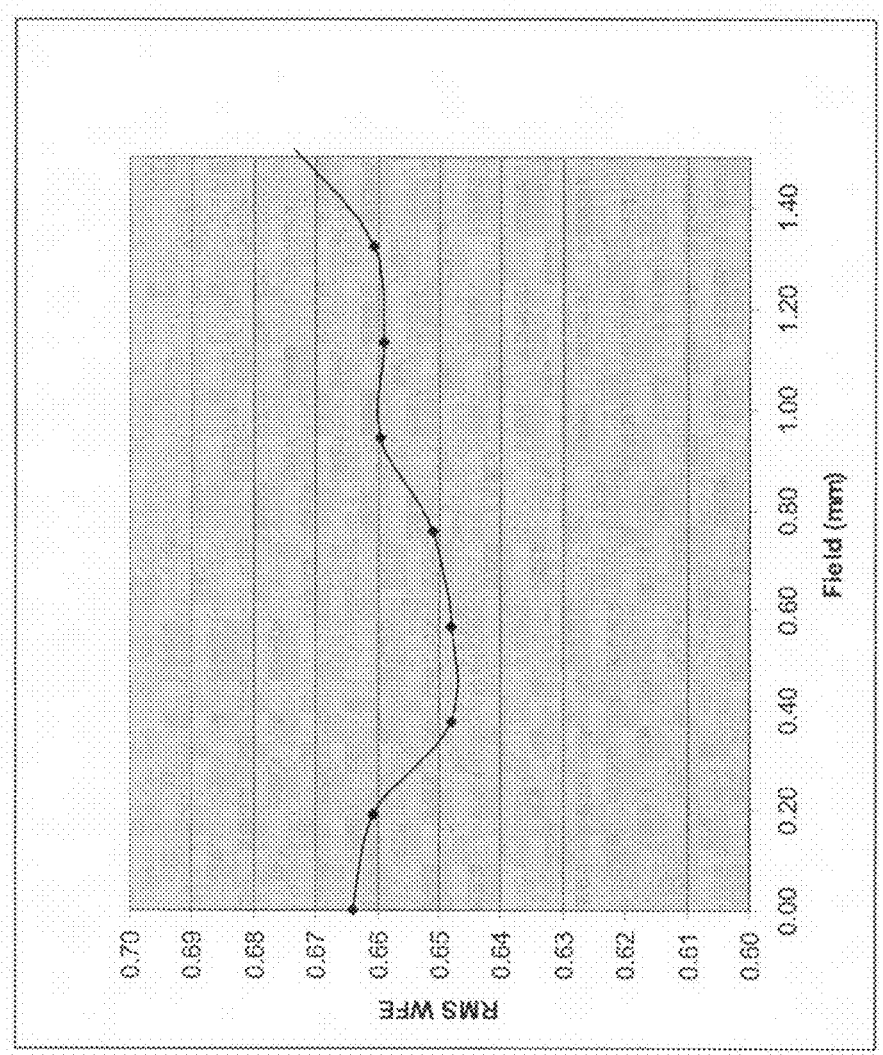
FIG. 4 is a graph of RMS Wavefront Error vs. Field for an extremely isoplanatic FT lens.

The nine Zernike terms of Equation 1 describe all first and third order wavefront properties. More generally, they specify the shape of the wavefront. FIG. 3 shows how the first 9 Zernike coefficients change vs. field. The slope of these curves indicates how the shape of the pixel wavefronts are changing. These curves also represent the many differing pixel wavefronts recorded in each hologram of an HDS system. FIG. 4 show how the RMS magnitude of the wavefront changes vs. field. An isoplanatic patch is an area where shape of the wavefront and its magnitude do not change significantly. To evaluate the size of our isoplanatic patch, an empirical criteria Inphase has developed of $\frac{1}{50}^{th}$ wave RMS is now introduced. While this value is much more stringent than the $\frac{1}{14}^{th}$ wave RMS Marechal criterion, see J. Wyant., K Creath, "Basic Wavefront Aberration Theory for Optical Metrology", Applied Optics and Optical Engineering Vol. XI, Ch 1, the entire contents of disclosure of which is hereby incorporated by reference.

Figure 5:
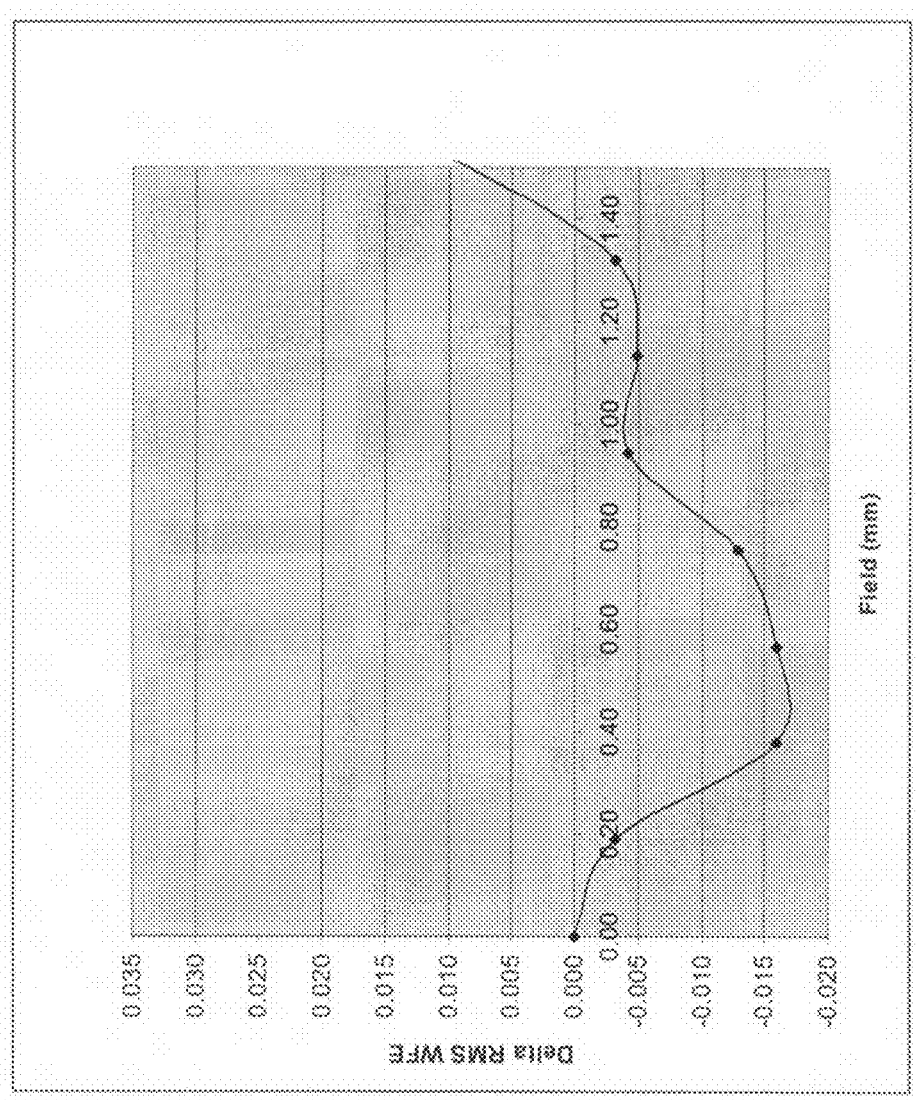
FIG. 5 is a graph of RMS Wavefront Error Difference vs. Field for an extremely isoplanatic FT lens.

For diffraction limited lens performance, it has proven to adequately predict SNR constancy when phase conjugating. Note that the $\frac{1}{50}^{th}$ wave value gives SNR constancy on a camera with 4.6 micron pixels and may be relaxed when larger pixels are used. Similarly it must be tightened when smaller pixels are used. Examining FIG. 5, it is possible extremely large isoplanatic patch between 0 and 1.4 mm of field. This 1.4 mm wide patch has less than $\frac{1}{50}^{th}$ wave RMS variation. At the edge of the field $\frac{1}{50}^{th}$ wave of variation corresponds to an isoplanatic patch width of approximately 400 microns. It is therefore possible to conclude that over neighborhoods in the field, of order 400 microns wide, the wavefront shape and magnitude changes of FIGS. 3 and 4 are insignificant. This has profound consequences when phase conjugating for reasons described.

Figure 6:
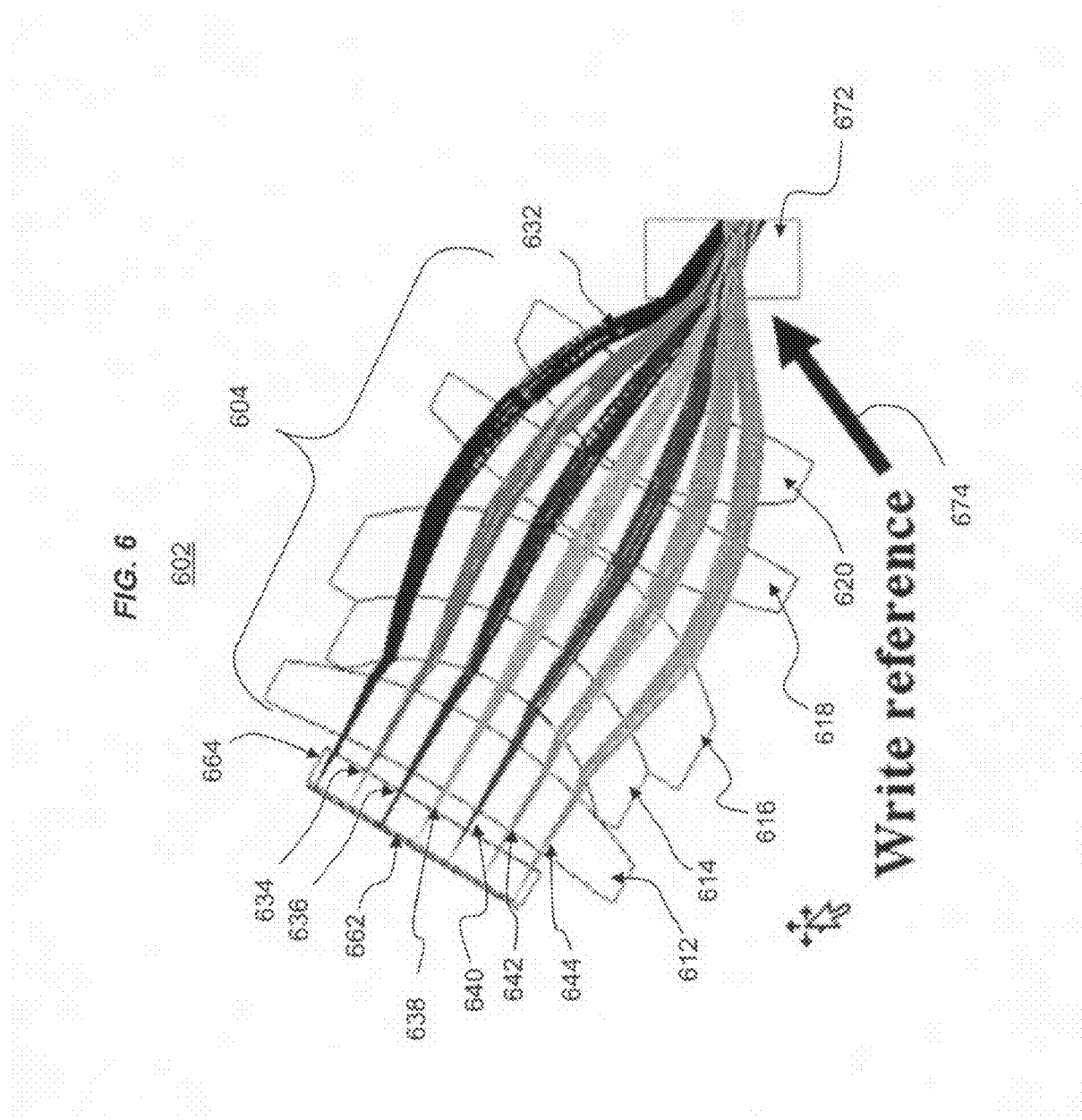
FIG. 6 is a schematic drawing of a recording process in a symmetric phase conjugating system.

Ideally holographic storage with phase conjugate readout is a 2 step process (1) A number of pixel wavefronts with varying errors, see FIGS. 2 and 3 and are recorded holographically into media using a write reference beam, see FIG. 6.
(2) Recorded pixel wavefronts are then read out using a read reference beam and an identical FT lens, see FIG. 7. On readout, the errors in each pixel wavefront are negated by the reverse propagation through the FT lens and perfect imaging is obtained.

This is true for any lens, regardless of quality or attributes such as isoplanatism.

FIG. 6 shows a recording process 602 in a symmetric phase conjugating system according to one embodiment of the present invention including an extremely isoplanatic FT lens 604 made up of lens elements 612, 614, 616, 618 and 620. FT lens 604 is optimized for isoplanatism by constraining the lens performance. Wavefronts 632, 634, 636, 638, 642 and 644 originate at an SLM 662 and passes through a filter λ/2 plate 664 prior to passing through FT lens 604. After passing through FT lens 604, Wavefronts 632, 634, 636, 638, 642 and 644 enter holographic storage medium 672 where they interfere with a reference beam, represented by arrow 674, to record data pages in holographic storage medium 672.

Figure 7:
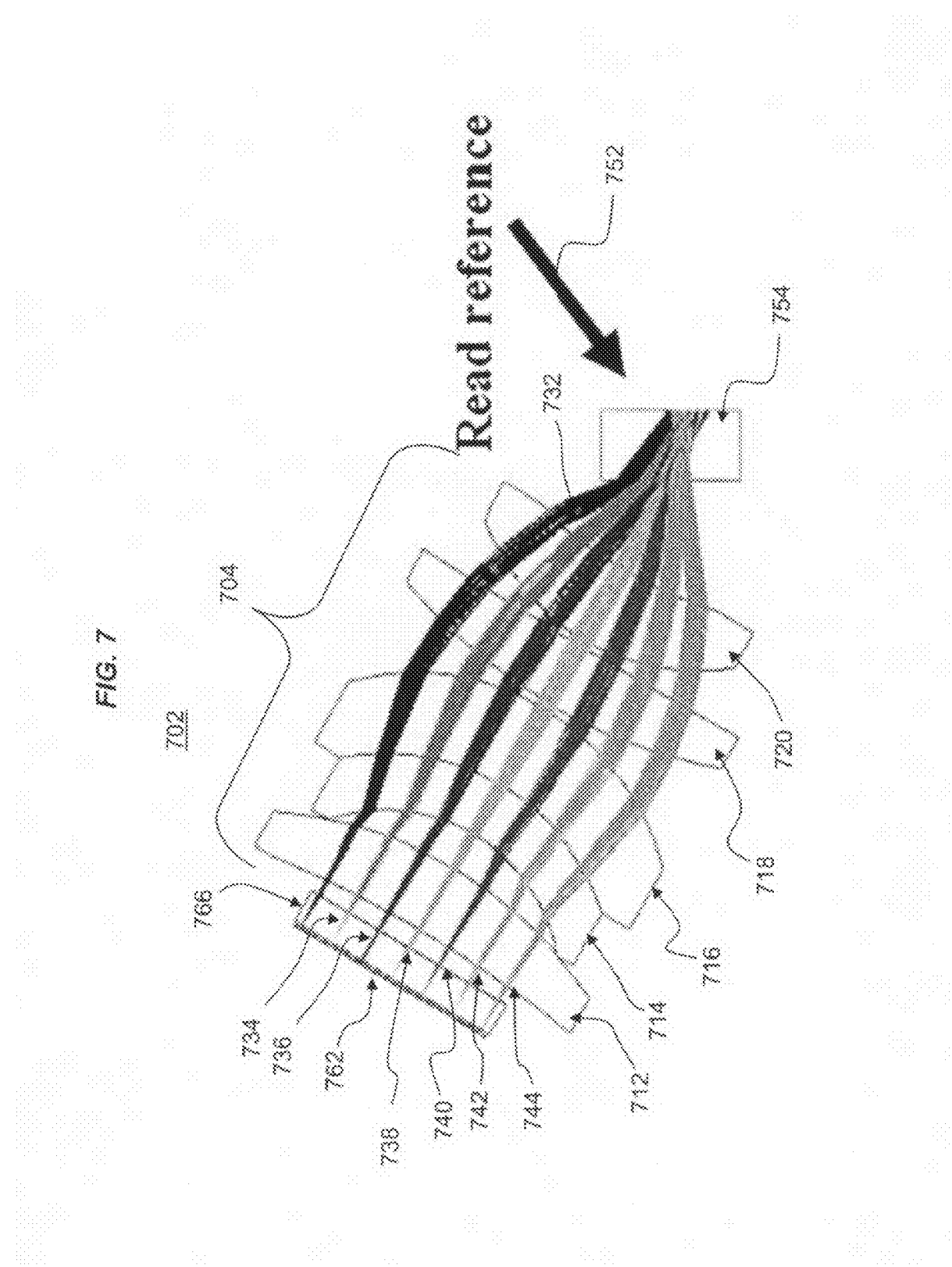
FIG. 7 is a schematic drawing of a readout process in a symmetric phase conjugating system, Imaging is perfect if readout conditions are identical to recording conditions.

FIG. 7 shows a readout process 702 in a symmetric phase conjugating system according to one embodiment of the present invention including an extremely isoplanatic FT lens 704 made up of lens elements 712, 714, 716, 718 and 720. FT lens 704 is optimized for isoplanatism by constraining the lens performance. Recovered wavefronts 732, 734, 736, 738, 742 and 744 are generated by a reference beam/reconstruction beam, indicated by arrow 752, that is directed into or is reflected into holographic storage medium 754. After passing through FT lens 704, recovered wavefronts 732, 734, 736, 738, 742 and 744 pass through a filter λ/2 plate 764 and are detected at a camera 766.

In practice, phase conjugation involves an intermediate process where, after recording, the media may shift, tilt, shrink, or change temperature. Readout may occur with an FT lens that differs from the recording FT lens due to manufacturing errors. Note that, in the general case, phase conjugation is always a two lens process as drive interchangeability is necessary for a valid commercial product. Because of this readout may also occur with an FT lens that differs from the recording FT lens due to manufacturing errors. In these instances, wavefront errors do no cancel out and imaging is imperfect. This is known as imperfect phase conjugation and it can be greatly mitigated by using an extremely isoplanatic FT lenses.

Consider tilt errors that introduce field shifts of about 400 microns. This shift is the size of our isoplanatic patch, so the RMS wavefront error should be less than $\frac{1}{50}^{th}$ wave.

Figure 8:
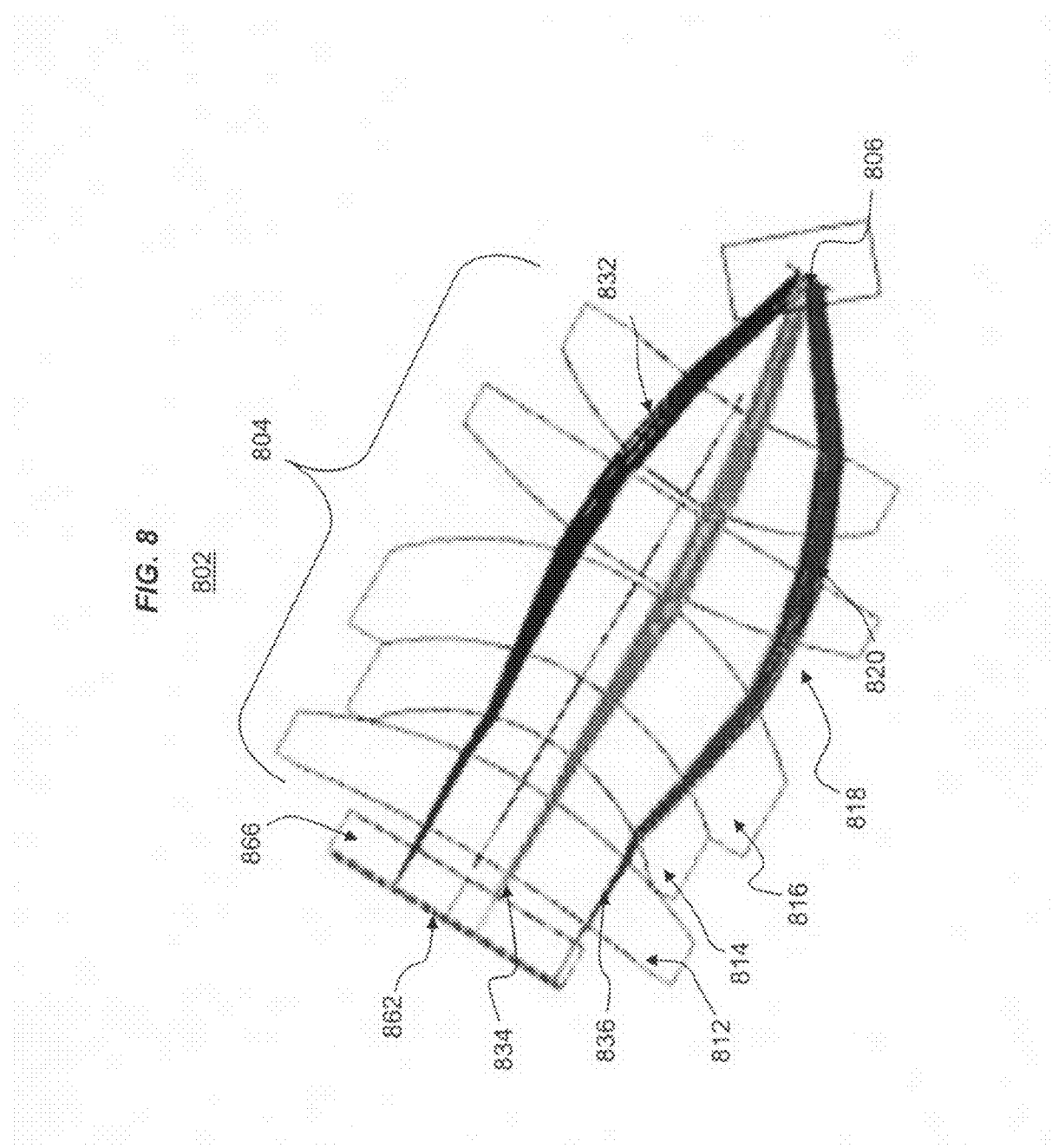
FIG. 8 is a schematic drawing of readout in a symmetric phase conjugating system with a 9.5 degree tilt error in medium location.

FIG. 8 shows a system 802 according to one embodiment of the present invention including an extremely isoplanatic readout lens 804 that has been tilted with respect to a holographic storage medium 806. FT lens 804 made up of lens elements 812, 814, 817, 818 and 820. FT lens 802 is optimized for isoplanatism by constraining the lens performance. Recovered wavefronts 832, 834 and 836 are generated by a reference beam (not shown) that is directed into or is reflected into holographic storage medium 806. After passing through FT lens 804, wavefronts 832, 834 and 836 pass through a filter λ/2 plate 864 and are detected at a camera 866.

Figure 9:
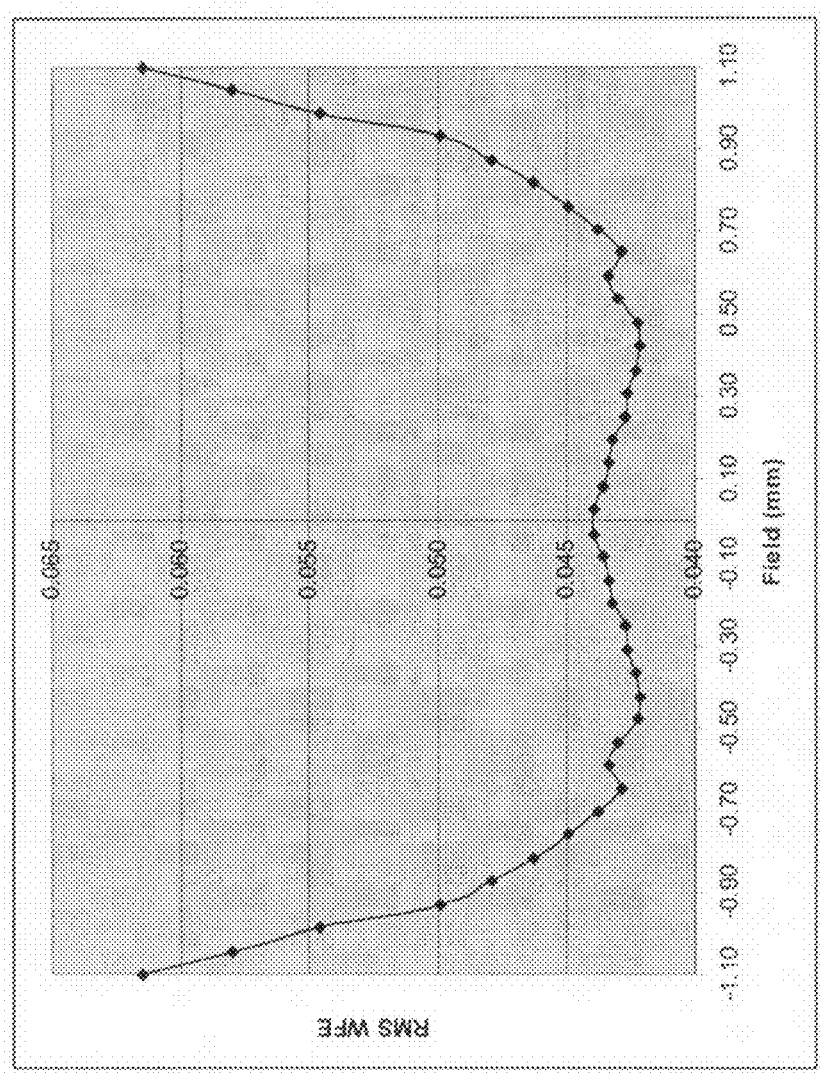
FIG. 9 is a graph of RMS Wavefront in a symmetric phase conjugating system having 9.5 degree tilt error in medium location.

The magnitude of the tilt may be determined from the isoplanatic patch size and the effective focal length: asin(0.4/2.4)=9.5 degrees. FIG. 9 shows the RMS WFE corresponding to 9.5 degrees of tilt is under $\frac{1}{50}^{th}$ wave as predicted. The reason such a large error in angle corresponds to such a small error in wavefront is the extreme isoplanatism if this lens. To better understand this, consider the pixel wavefront that was at 1.5 mm of field during recording, with this tilt, the wavefront was read out or phase conjugated at 1.1 mm of field. Because the aberrations at both field points were nearly identical, or by definition extremely isoplanatic, phase conjugation was near perfect. This tilt insensitivity is very important when doing wavelength compensation for thermal effects although tilts encountered in a conventional HDS system are much smaller them 9.5 degrees, see A. Hoskins, et al, "Tolerances of a Page-Based Holographic Data Storage System", Invited talk, ODS Proceedings (2007), the entire contents and disclosure of which is hereby incorporated by reference.

Figure 10:
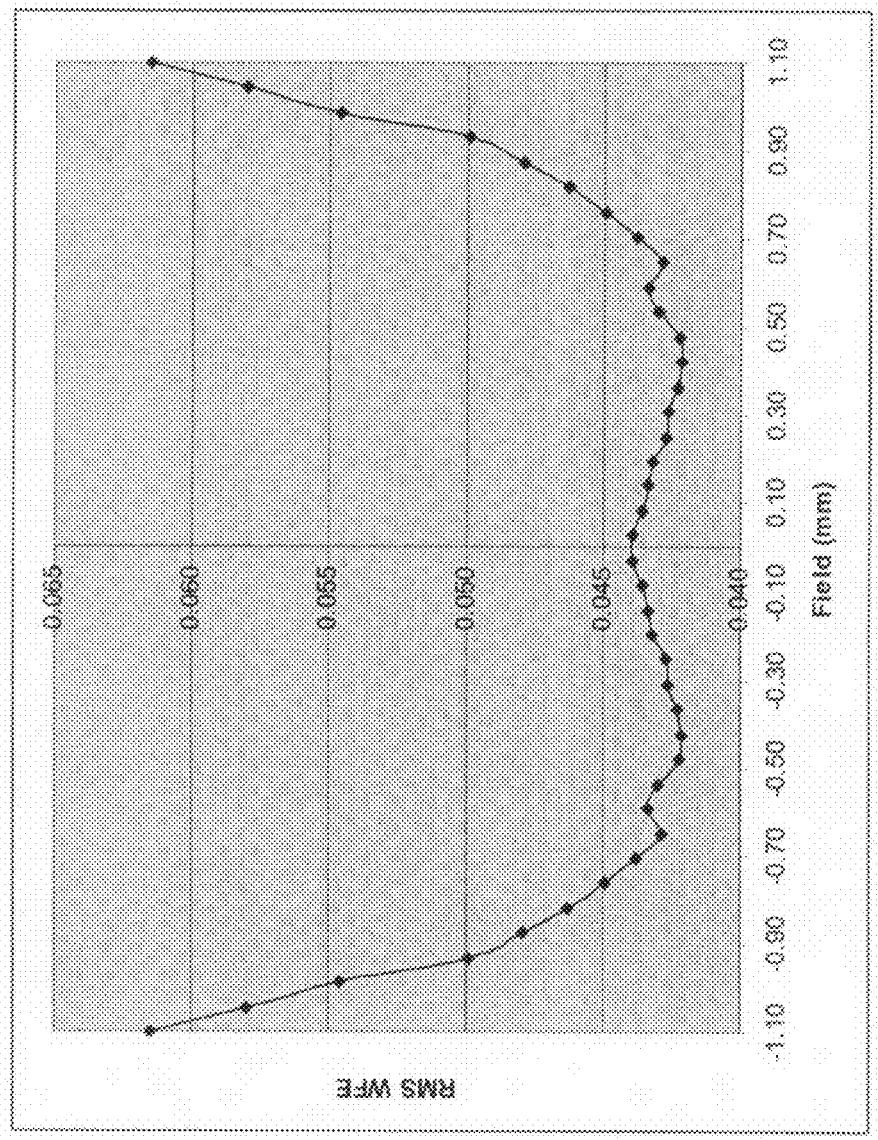
FIG. 10 is a graph of RMS Wavefront in a symmetric phase conjugating system having an 80 micron lateral shift error in medium location.
Figure 11:
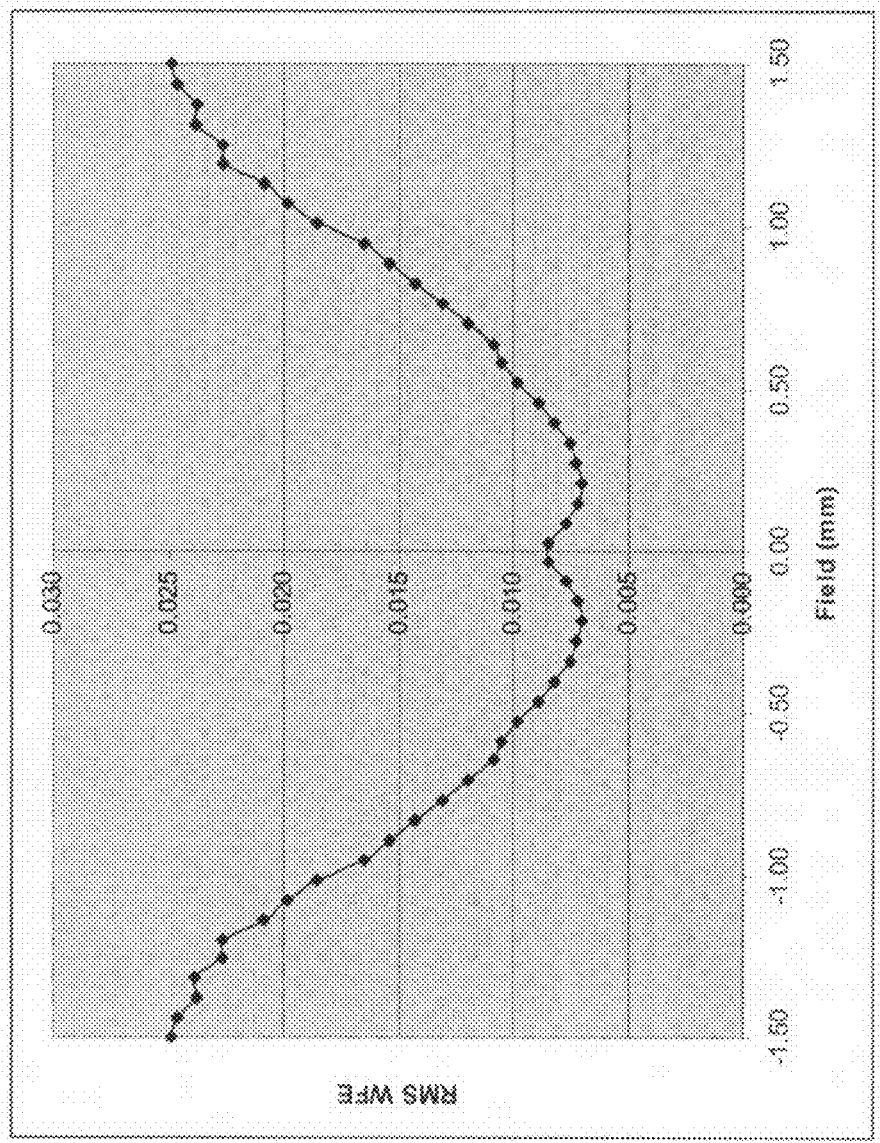
FIG. 11 is a graph of RMS Wavefront in a symmetric phase conjugating system having an 80 micron axial shift error in medium location.

Now consider shift errors in the hologram location. Lateral shifts are used in polytopic multiplexing and must be well controlled in a holographic data storage system. They must be controlled to a precision of approximately $\frac{1}{10}^{th}$ of a book width, see K. Anderson, K. Curtis, "Polytopic multiplexing," Opt. Lett., 29, 1402-1404 (2004) and K. Anderson, et al, "How to write good books," *Invited talk*, ODS Proceedings (2006), the entire contents of disclosures of which are hereby incorporated by reference, with is about 15 um for the HDS system of our current lens. Similarly, axial shifts typically need to be controlled with approximately the same precision. FIGS. 10 and 11 show that for 80 microns of lateral or axial shift, RMS WFE remains near the $\frac{1}{50}^{th}$ wave criteria. This is over 5 times the required tolerance because the FT lens is extremely isoplanatic. Although media shifts direct recorded pixel wavefronts through slightly different paths than (the ideally isoplanatic tilts) tilts, phase conjugation is still near perfect. As seen in FIGS. 10 and 11, extremely isoplanatic FT lenses are very tolerant of positional errors. Because extremely isoplanatic lenses have greater tolerance latitude than required, extremely isoplanatic lenses may be manufactured with relaxed tolerances.

Figure 12:
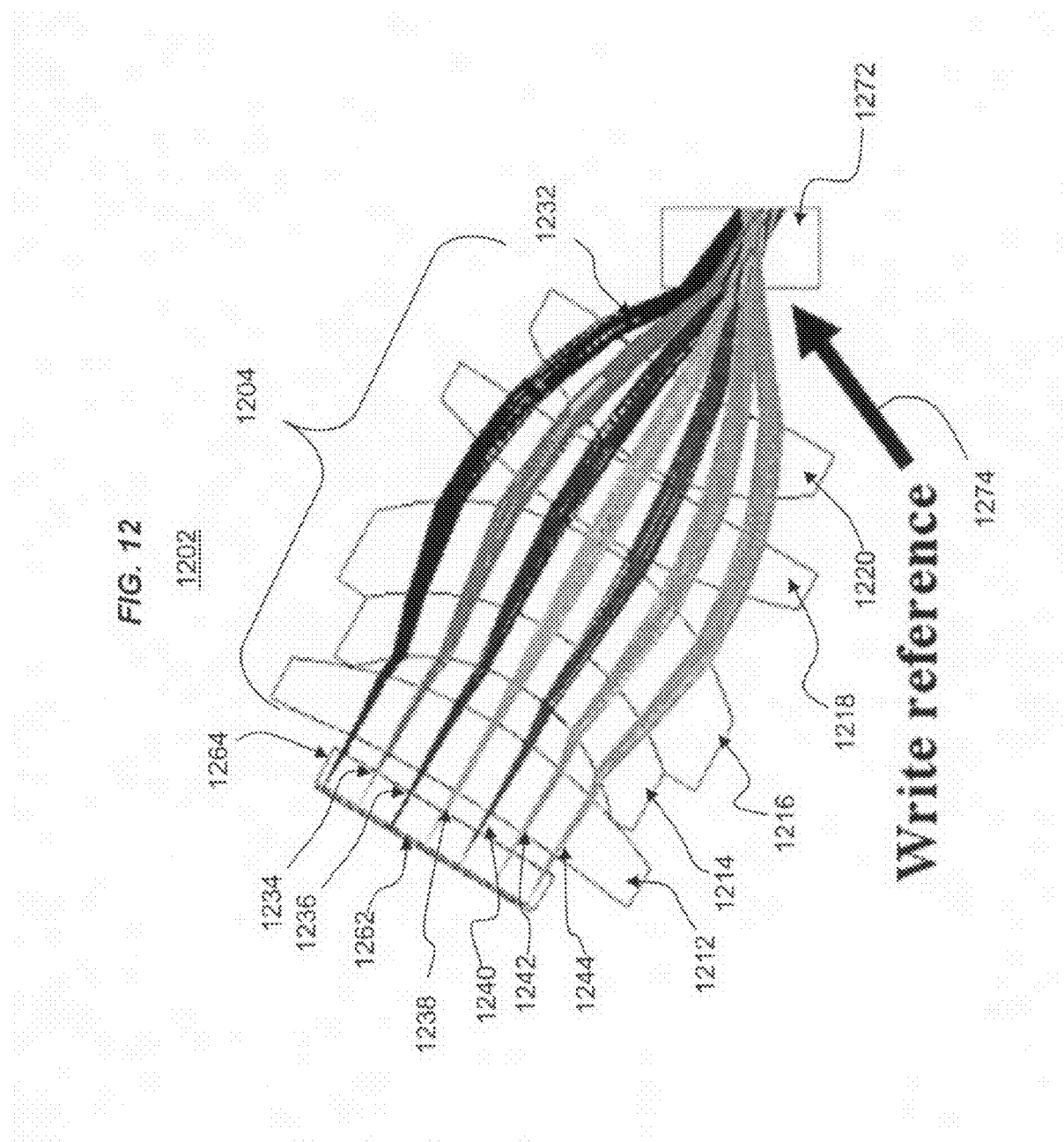
FIG. 12 is a schematic drawing of a recording process in an asymmetric phase conjugating system.

FIG. 12 shows a recording process 1202 in an asymmetric phase conjugating system according to one embodiment of the present invention including an extremely isoplanatic FT lens 1204 made up of lens elements 1212, 1214, 1216, 1218 and 1220. FT lens 1204 is optimized for isoplanatism by constraining the lens performance. Wavefronts 1232, 1234, 1236, 1238, 1242 and 1244 originate at an SLM 1262 and passes through a filter λ/2 plate 1264 prior to passing through FT lens 1204. After passing through FT lens 1204, wavefronts 1232, 1234, 1236, 1238, 1242 and 1244 enter holographic storage medium 1272 where they interfere with a reference beam, represented by arrow 1274, to record data pages in holographic storage medium 1272.

Figure 13:
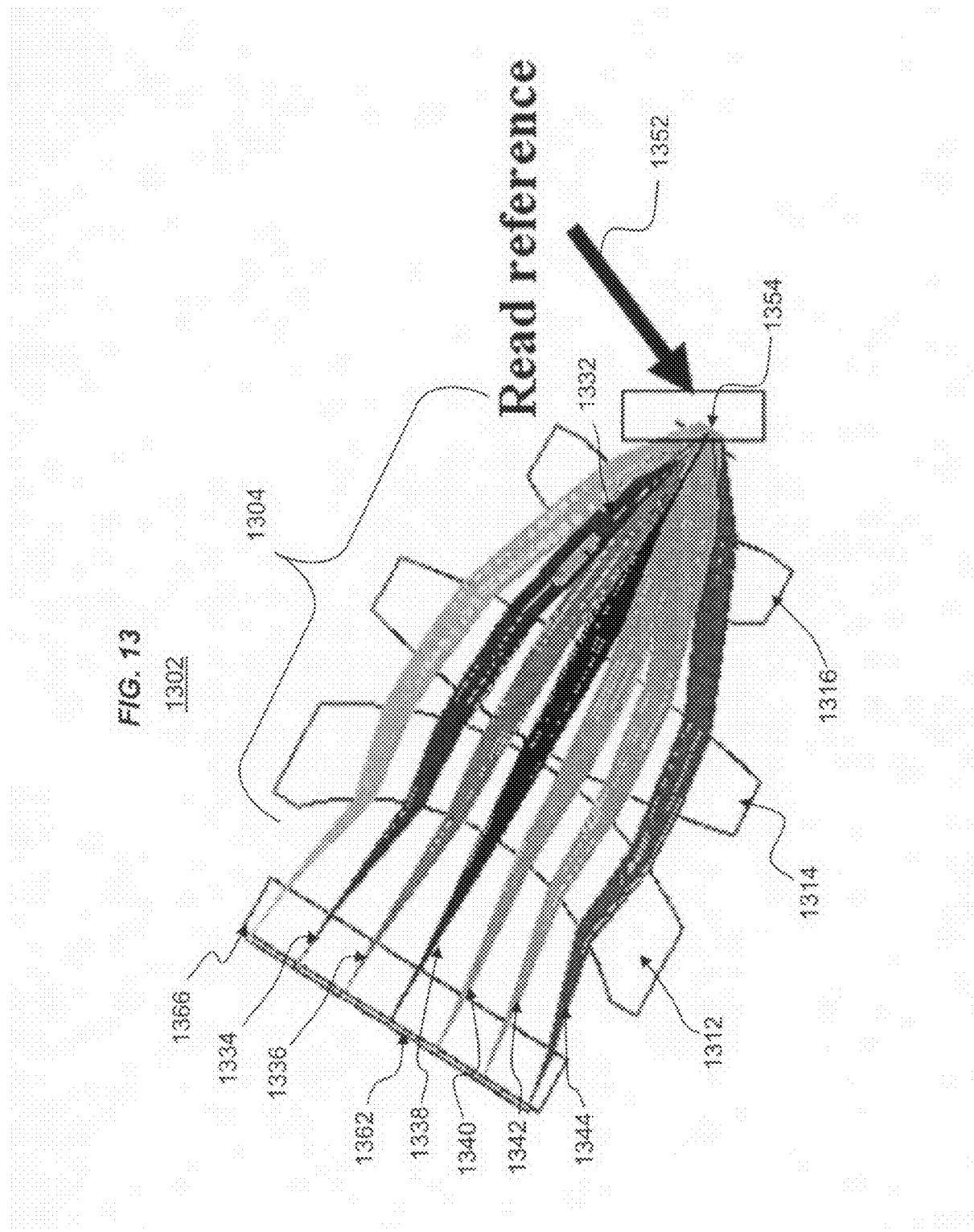
FIG. 13 is a schematic drawing of a readout process in an asymmetric phase conjugating system.

FIG. 13 shows a readout process 1302 in an asymmetric phase conjugating system according to one embodiment of the present invention including an extremely isoplanatic FT lens 1304 made up of lens elements 1312, 1314 and 1316. FT lens 1304 is optimized for isoplanatism by constraining the lens performance. Recovered wavefronts 1332, 1334, 1336, 1338, 1342 and 1344 are generated by a reference beam/reconstruction beam, indicated by arrow 1352, which is directed into or is reflected into a tilted holographic storage medium 1354. After passing through FT lens 1304, recovered wavefronts 1332, 1334, 1336, 1338, 1342 and 1344 pass through a filter λ/2 plate 1364 and are detected at a camera 1366.

Figure 14:
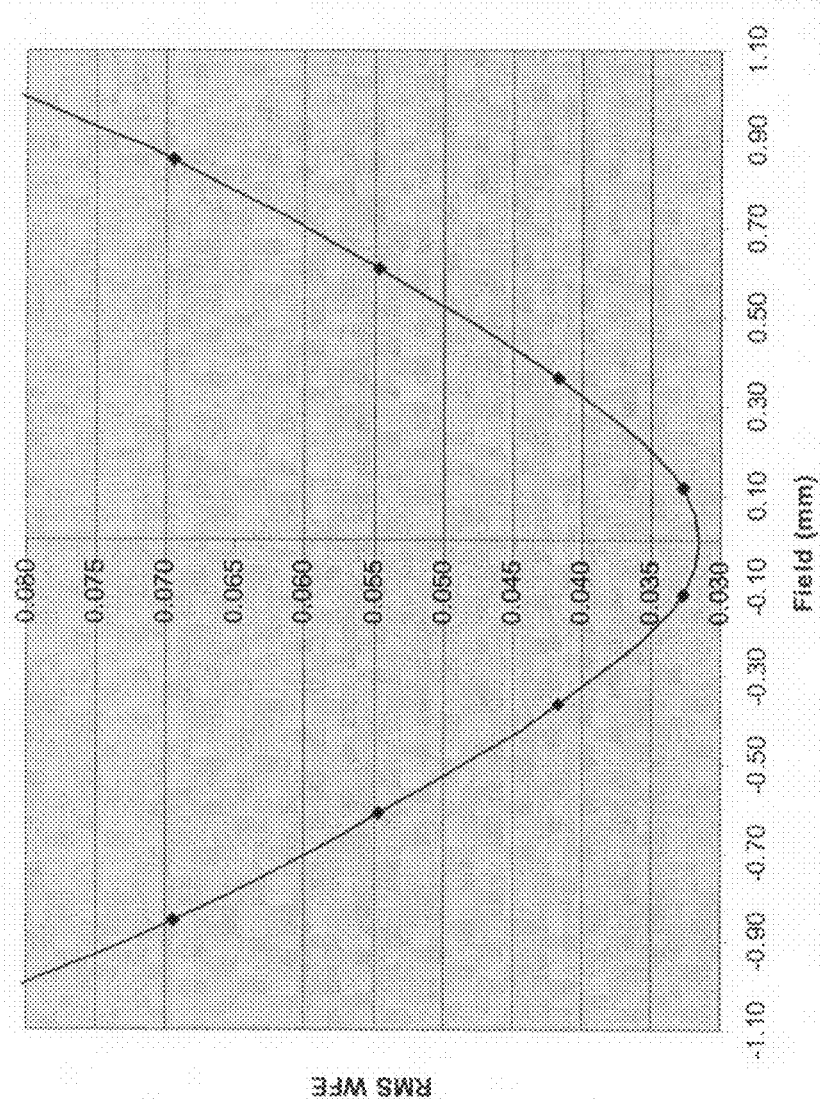
FIG. 14 is a graph of RMS Wavefront in an asymmetric phase conjugating system having 9.5 degree tilt error in medium location.
Figure 15:
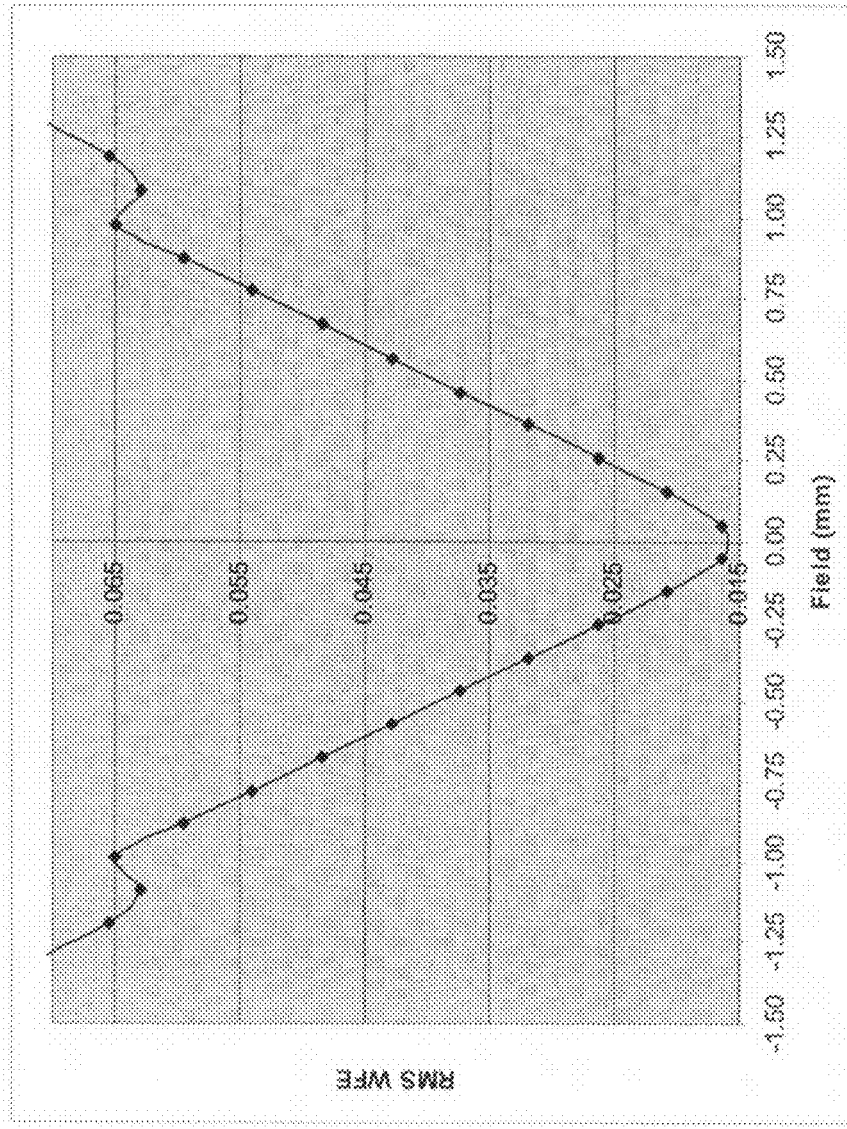
FIG. 15 is a graph of RMS Wavefront in an asymmetric phase conjugating system having an 80 micron lateral shift error in medium location.
Figure 16:
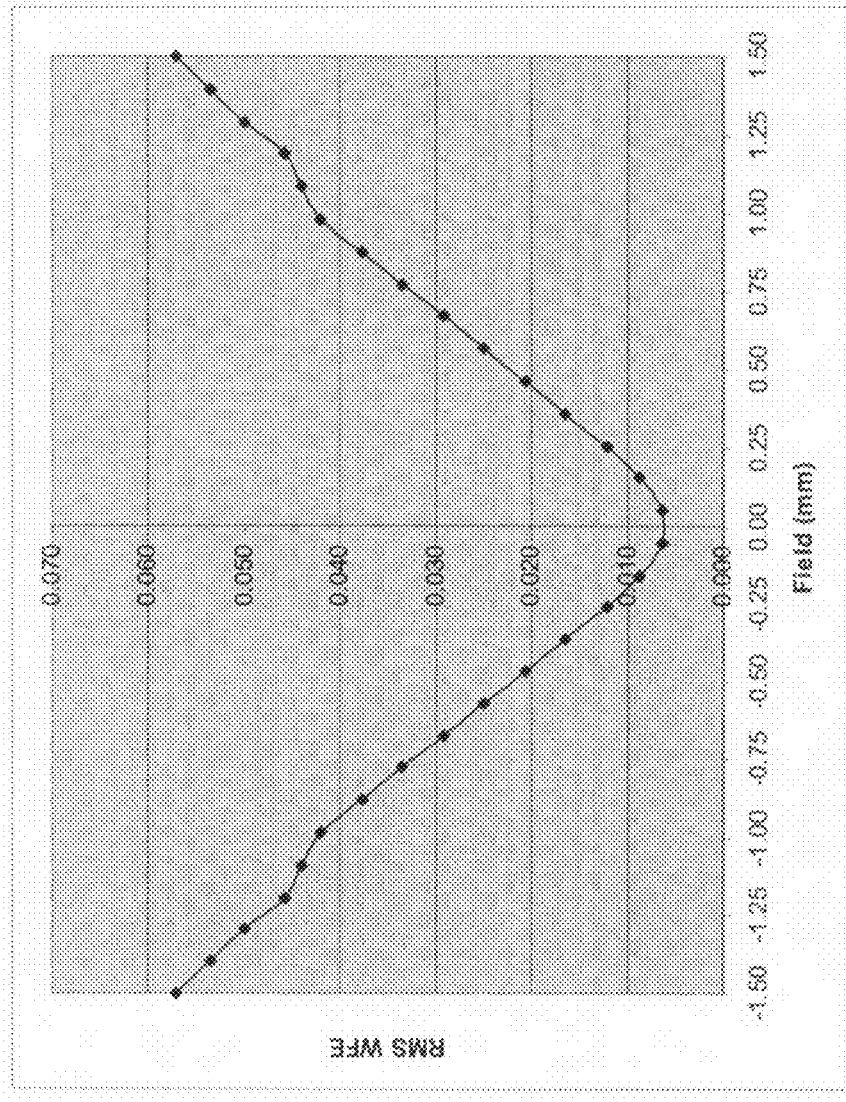
FIG. 16 is a graph of RMS Wavefront in an asymmetric phase conjugating system having an 80 micron axial shift error in medium location.

The recording and readout system of FIGS. 12 and 13 is considered asymmetric because the readout FT lens differs from the recording FT lens. Here the recording lens is the same 5 element FT lens of the prior examples but the readout lens is a simplified 3 element design with identical effective focal length and nearly identical isoplanatism. All pixel wavefronts on the object and image side of this system also have identical solid angle. This feature, also known as cos^3 correction is required for polytopic multiplexing. This simplification has great advantages in terms of complexity and cost but comes with a slightly compromised SNR constancy (0.26 dB). For these systems, the acceptance criteria is relaxed from $\frac{1}{50}$th wave RMS to $\frac{1}{20}$th wave RMS. Perturbations remain identical to those above. The RMS WFE evaluations of FIGS. 9, 10 and 11 are reproduced for this asymmetric case in FIGS. 14, 15 and 16, respectively. In each case, the relaxed $\frac{1}{20}$th wave rms criteria is met. This system, like that above, is robust because each FT lens is extremely isoplanatic.

Inphase has developed a numerical model of the holographic system which predicts the recovered page SNR using a PSF created using Huygens' method and the k-sphere formulation of volume holograms. Tests of the model show good correlation with experimental data for media shift and rotation. In addition to verifying the sources of the tolerances, the model has been adapted as a Zemax® plug-in. SNR curves present here are generated using this proprietary tool.

Figure 17:
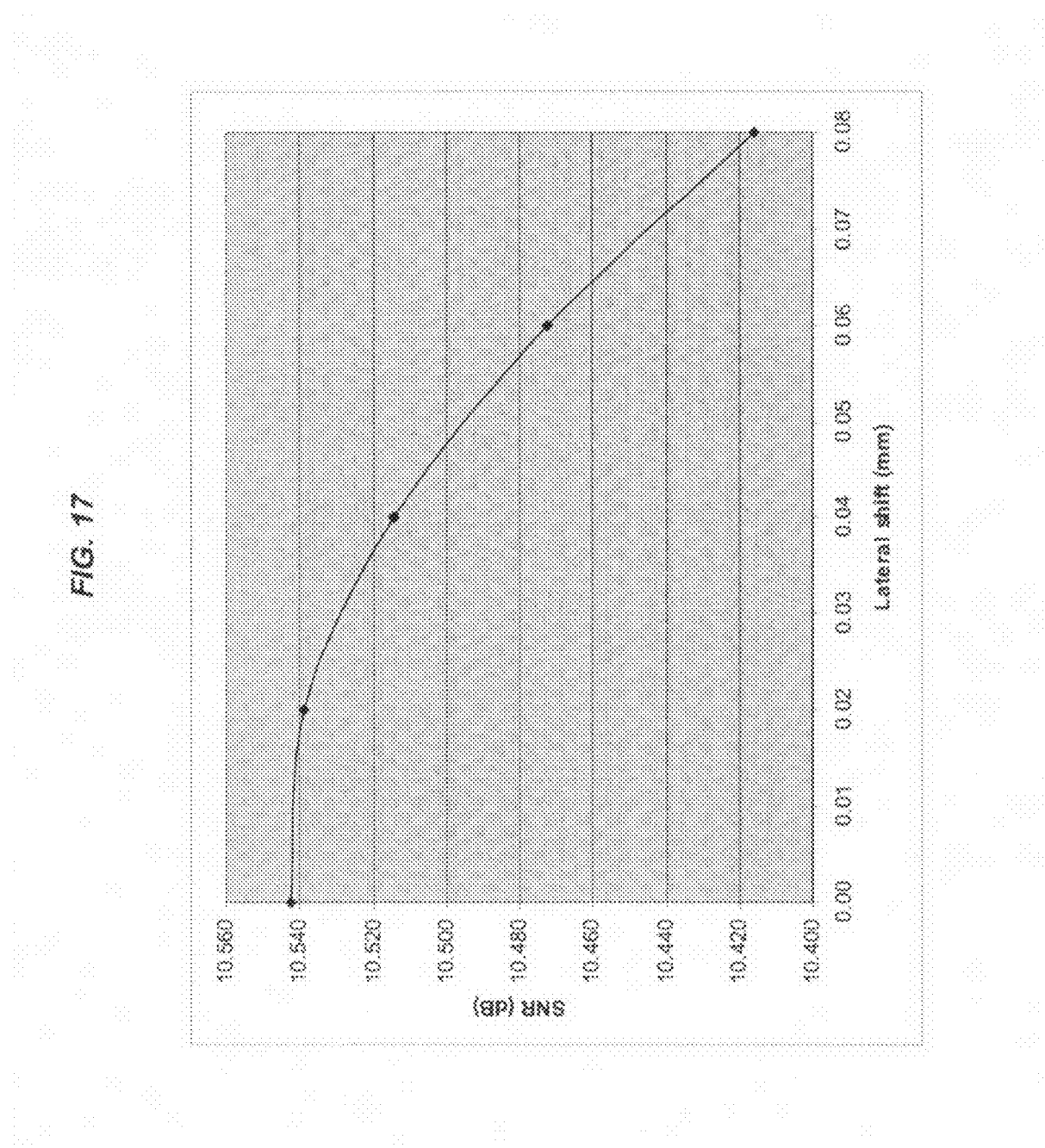
FIG. 17 is a graph of Average SNR vs. Lateral Shift in a symmetric phase conjugating system ($\frac{1}{50}^{th}$ wave criteria)
Figure 18:
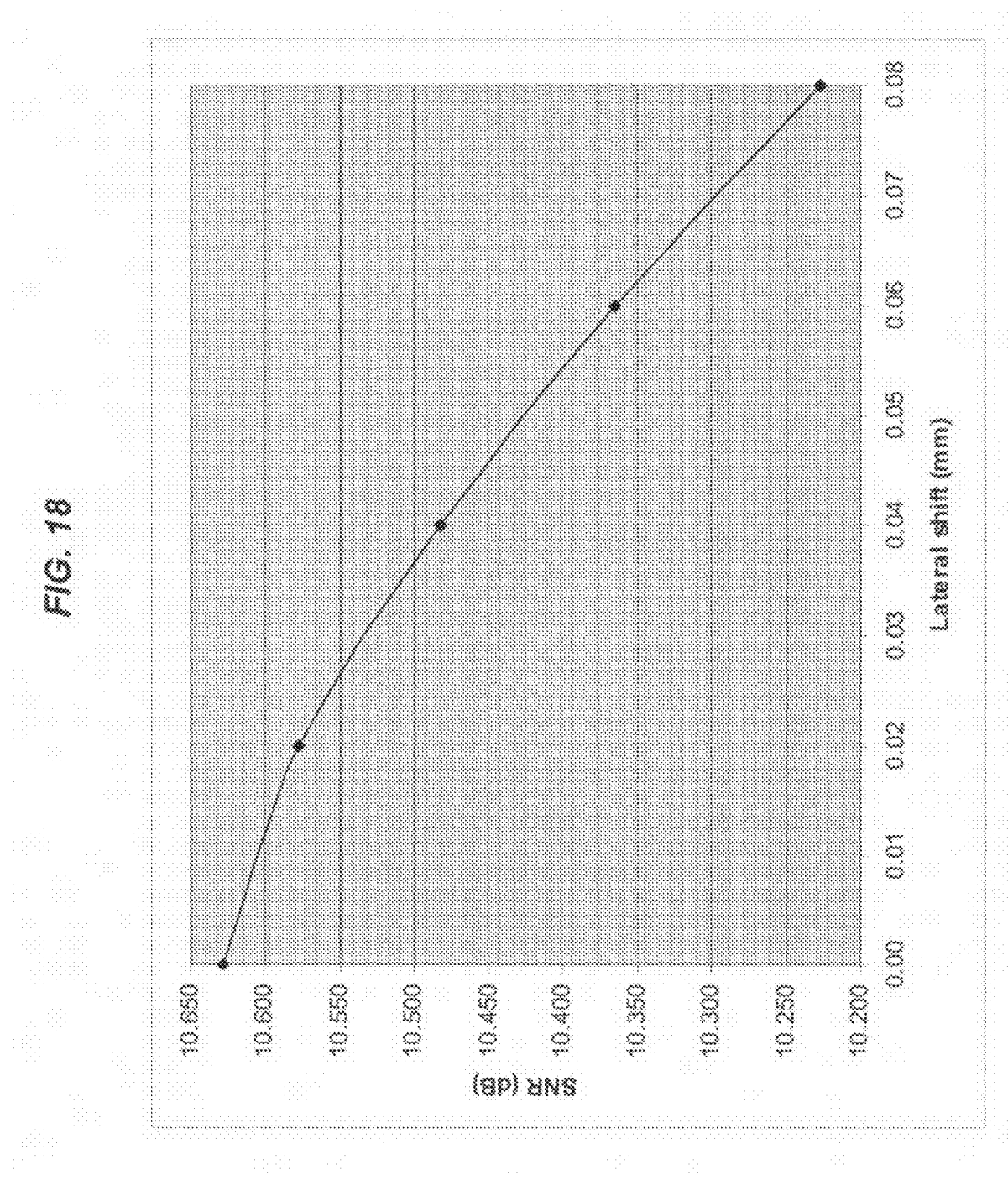
FIG. 18 is a graph of Average SNR vs. Lateral Shift in an asymmetric phase conjugating system ($\frac{1}{20}^{th}$ wave criteria)

FIGS. 17 and 18 compare SNR constancy, with respect to lateral media shift, in the symmetric and asymmetric phase conjugating systems. SNR constancy of the symmetric system (satisfying the $\frac{1}{50}$th wave criteria) is 0.14 dB. SNR constancy of the asymmetric system (satisfying the $\frac{1}{20}$th wave criteria) is 0.4 dB. Note that the symmetric system could be made even more tolerant of errors if SNR constancy were compromised to the 0.4 dB level.

An extremely isoplanatic FT lens provides a wide tolerance latitude for hologram shifts and tilts. An extremely isoplanatic FT lens also provides wide tolerance latitude for lens element tilts and decenters. An extremely isoplanatic FT lens can be tilted and decentered to prevent hot spots. An extremely isoplanatic FT lens can be phase conjugated with a different, simpler, isoplanatic FT lens. FIG. 17 is a graph of Average SNR vs. Lateral Shift in a symmetric phase conjugating system ($1/50^{th}$ wave criteria). An extremely isoplanatic FT lens relaxes placement tolerance of polytopic filter. An extremely isoplanatic FT has much better distortion in the presence of hologram shift. An extremely isoplanatic FT can also keep solid angle subtended by exit pupil, for each pixel, constant, even for non-telecentric systems which is useful in polytopic multiplexing. An extremely isoplanatic lens may be represented by a single fourier transform thereby allow the phase mask to operate in the idealized conditions for which it was designed, see such as described in Pat. App. No. 2007/0091399 (Ihas et al.), entitled "METHOD AND SYSTEM FOR INCREASING HOLOGRAPHIC DATA STORAGE CAPACITY USING IRRADIANCE-TAILORING ELEMENT," published Apr. 26, 2007, the entire contents and disclosure of which is hereby incorporated by reference.

Figure 19:
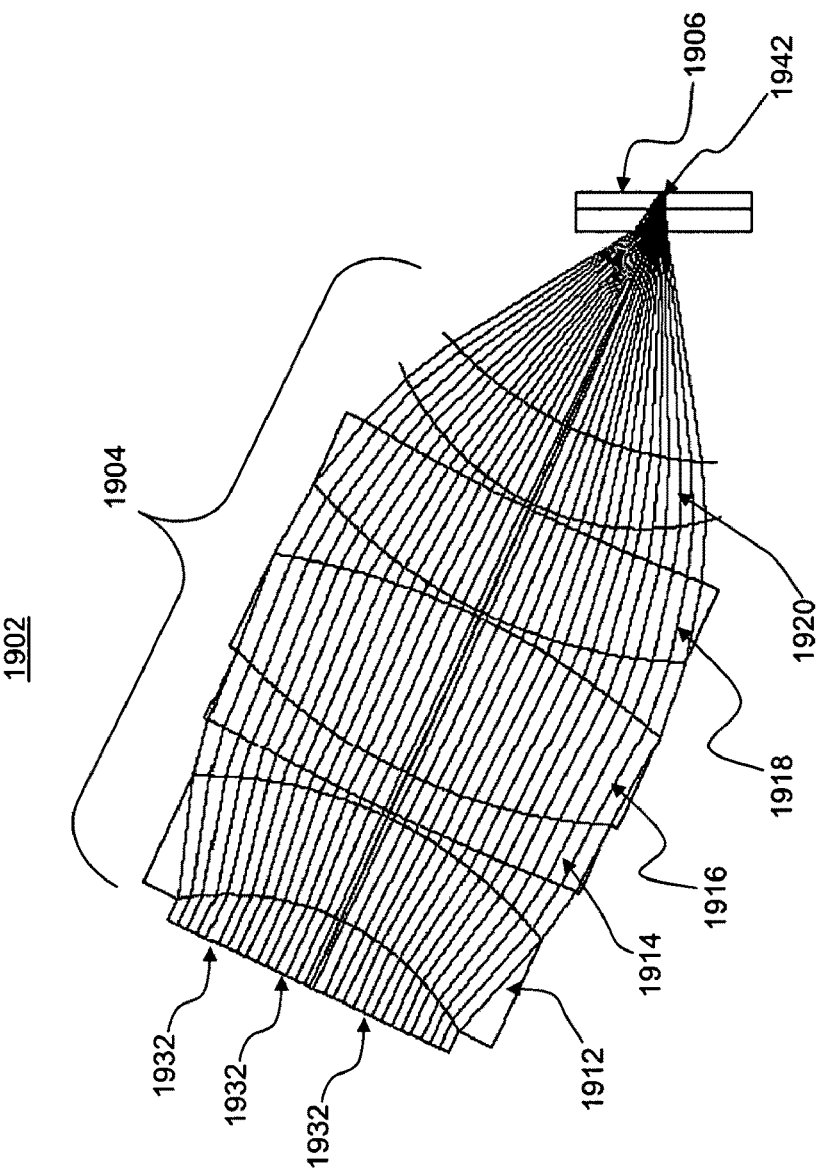
FIG. 19 is a schematic drawing conventional, diffraction limited, on-axis FT lens, shown writing in a tilted medium.

Coherent Hot Spots are formed when rays of coherent light overlap inside the medium and interfere constructively. FIG. 19 shows a recording process 1902 in which a conventional, diffraction limited, on-axis FT lens 1904, shown writing in a tilted medium 1906. On-axis FT lens 1904 made up of lens elements 1912, 1914, 1916, 1918 and 1920. Parallel rays 1932, only three of which are labeled for convenience, on the left represent the reflection of the plane wave that illuminates the SLM (not shown). Rays 1932 converge near the center 1942 of medium 1906, represented by the rightmost surface. When the rays converge they may sum coherently.

Figure 20:
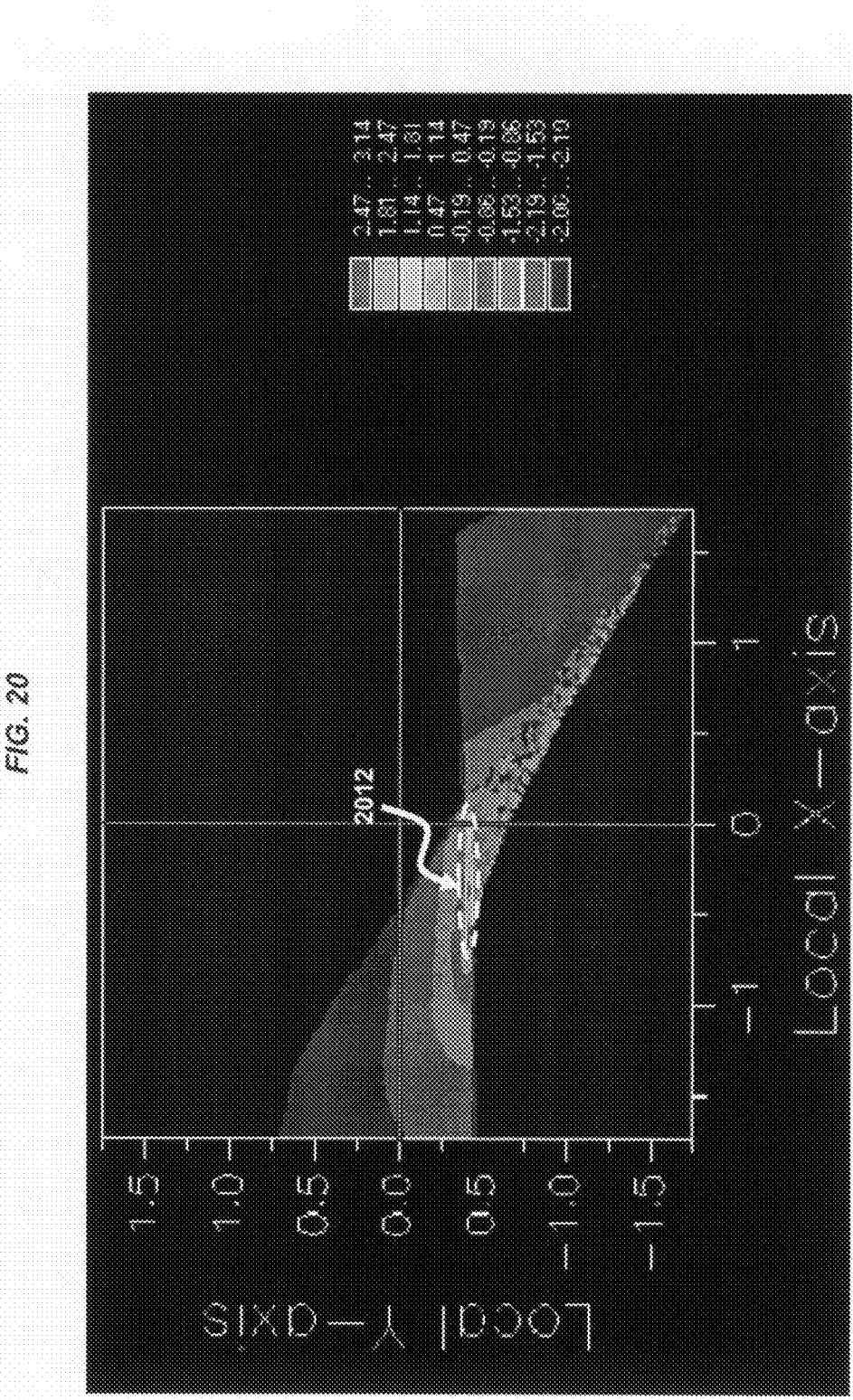
FIG. 20 is a sectional view, through the thickness of the medium of FIG. 19, showing relative size and irradiance of the data beam.

FIG. 20 is a sectional view, through the thickness of the medium of FIG. 19, showing relative size and irradiance of the data beam. Included is the constructive interference of the rays shown in FIG. 19. In FIG. 20 there is a coherent hot spot 2012, a region of high irradiance that is approximately 800 microns long. Coherent hot spots consume M/# and limit the number of holograms that can be written at a give location. It is advantageous to minimize the irradiance and volume of coherent hot spots.

Figure 21:
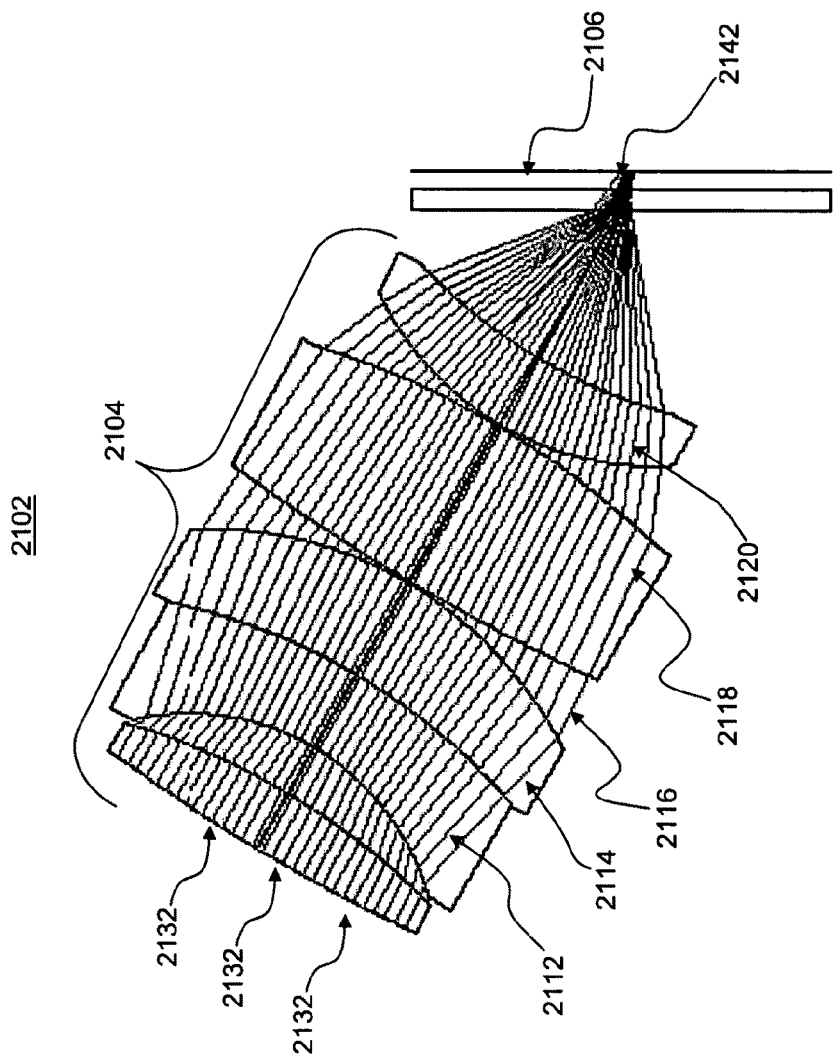
FIG. 21 is a schematic drawing of an extremely isoplanatic, on-axis FT lens, shown writing in a tilted medium.

Extremely isoplanatic FT lenses have less intense coherent hot spots than conventional FT lenses. FIG. 21 shows a recording process 2102 in which an extremely isoplanatic FT lens 2104 according to one embodiment of the present invention, is shown writing in a tilted medium 2106. Extremely isoplanatic FT lens 2104 made up of lens elements 2112, 2114, 2116, 2118 and 2120. Parallel rays 2132, only three of which are labeled for convenience, on the left represent the reflection of the plane wave that illuminates the SLM (not shown). Rays 2132 converge near the center 2142 of medium 2106, represented by the rightmost surface. When the rays converge they may sum coherently.

Figure 22:
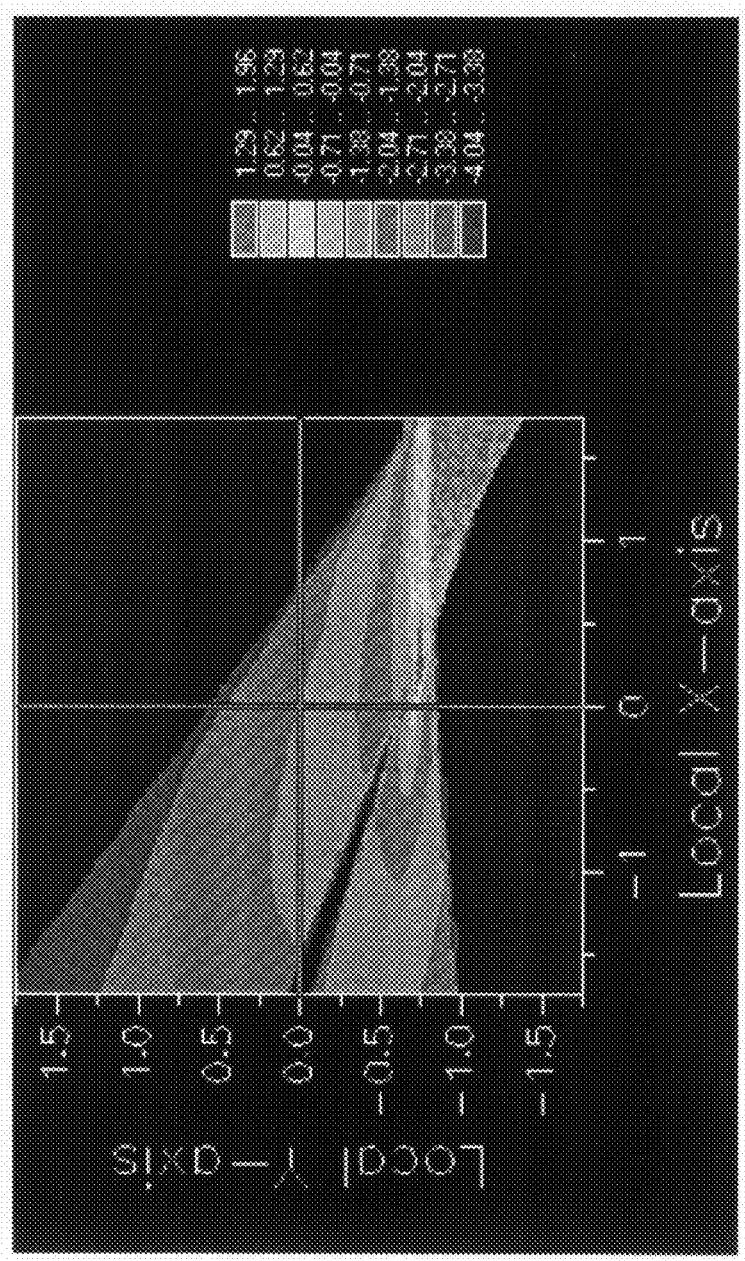
FIG. 22 is a sectional view, through the thickness of the medium of FIG. 21, showing relative size and irradiance of the data beam.

FIG. 22 is a sectional view, through the thickness of the medium of FIG. 21, showing relative size and irradiance of the data beam. The peak irradiance in the medium of FIG. 22 is 15 times less than that of FIG. 20. The peak irradiance is mitigated because fewer rays sum constructively.

Lens elements in an extremely isoplanatic FT lens may be decentered to minimize volume of coherent hot spots.

Figure 23:
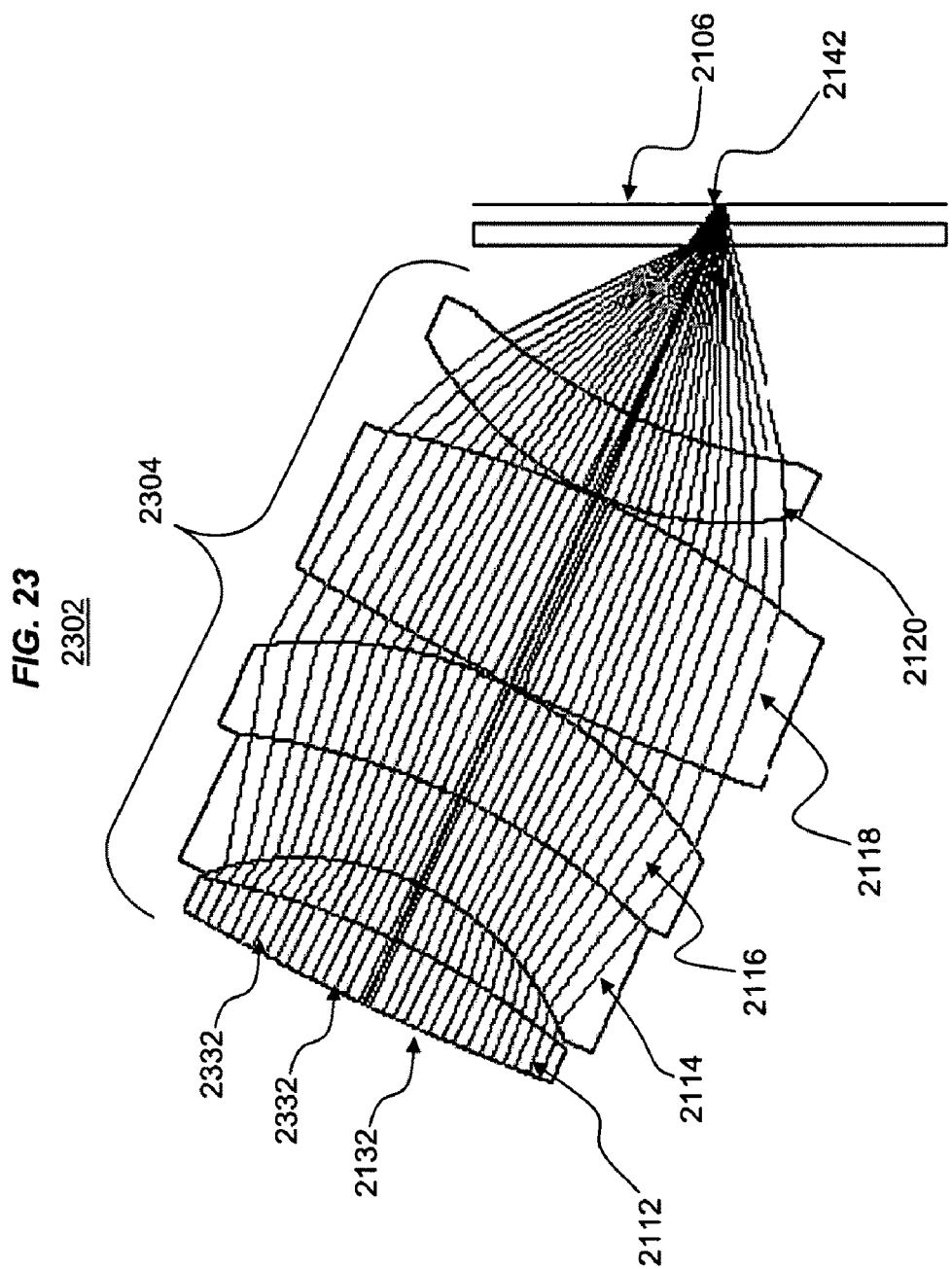
FIG. 23 is a schematic drawing of the extremely isoplanatic FT lens of FIG. 21, with elements shifted off axis, shown writing in a tilted medium.

FIG. 23 shows a recording process 2302 employing an extremely isoplanatic FT lens 2304 that to write to tilted medium 2106. Extremely isoplanatic lens 2304 is shifted off axis, or decentered, because lens element 2120 is shifted up, and lens elements 2112, 2114, 2116 and 2118 are shifted down.

Figure 24:
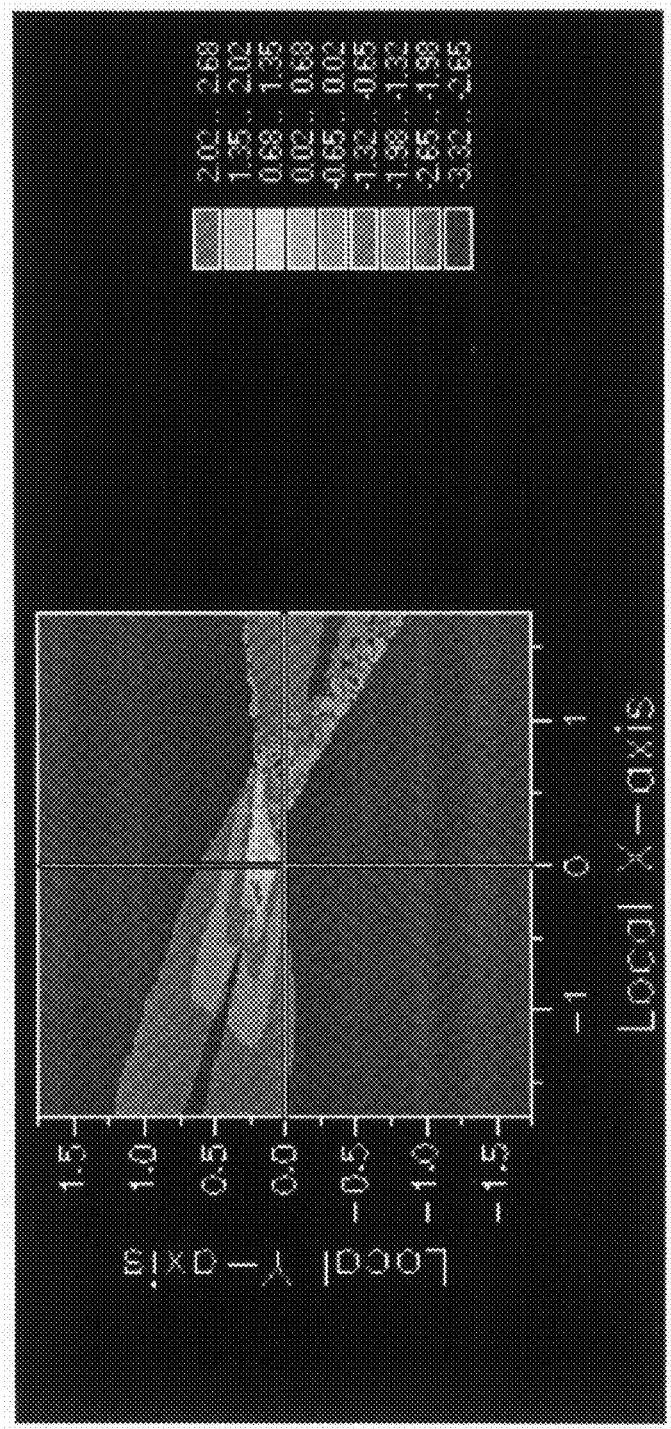
FIG. 24 is a sectional view, through the thickness of the medium of FIG. 23, showing relative size and irradiance of the data beam.

FIG. 24 is a sectional view, through the thickness of the medium of FIG. 23 showing relative size and irradiance of the data beam, where lens element 2120 has been shifted up 300 µm and lens elements 2112, 2114, 2116 and 2118 have been shifted down 300 µm. This decentered extremely isoplanatic lens has a coherent hot spot that is less than half the volume of that of the conventional FT lens shown in FIG. 20. The decentered elements have directed the rays in such a way as to minimize the volume over which constructive interference can occur.

Consider the decentered, extremely isoplanatic FT lens 2304 of FIG. 23. All lens elements in this compound lens are identical to the on-axis extremely isoplanatic lens 2104 of FIG. 21, except that the lens elements are decentered. Even with the lens elements decentered over 300 um, the decentered lens performance is nearly identical to the on-axis lens. This insensitivity to lens location allows for loose assembly tolerances. The amount of decenter a lens can tolerate without SNR loss is directly related to the size of the extremely isoplanatic patch, larger patches giving looser tolerances.

These loose tolerances can be budgeted between read FT lenses and write FT lenses that belong to different holographic data storage systems. Such a budget allows one to interchange the hologram between systems with minimal SNR loss.

Oversampled systems, such as described in Pat. App. No. 2005/0286388 (Ayres et al.), entitled "PROCESSING DATA PIXELS IN A HOLOGRAPHIC DATA STORAGE SYSTEM," published Dec. 29, 2005, the entire contents and disclosure of which is hereby incorporated by reference, remove distortion in an image prior to decoding. In at least some embodiments, the extremely isoplanatic FT lenses of the present invention have less distortion, therefore, put less stress on the oversampling algorithm. This means the hologram can shift further before the oversampling algorithm fails.

EXAMPLE

Example 1

An extremely isoplanatic FT lens is made according to FIG. 2. The effective focal length (EFL) for the lens is 2.4 mm and the field for the lens is 1.5 mm.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A holographic storage device or system comprising:
    a reference beam source for generating a reference beam;
    a data beam source for generating a data beam; and
    an extremely isoplanatic lens through which the data beam passes prior to entering a holographic storage medium, wherein the reference beam and data beam interfere in the holographic storage medium to record one or more data pages in the holographic storage medium.

2. The holographic storage recovery device or system of claim 1, wherein the extremely isoplanatic lens is decentered.

3. The holographic storage recovery device or system of claim 1, wherein the extremely isoplanatic lens is on axis.

4. A method comprising the following steps:
(a) passing a data beam through an extremely isoplanatic lens to form a focused data beam; and
(b) recording one or more data pages in a holographic storage medium by interfering the focused data beam with a reference beam.

5. A holographic storage recovery device or system comprising:
a reconstruction beam source for generating a reconstruction beam that passes through a holographic storage medium to thereby form a recovered beam from one or more data pages stored in the holographic storage medium;
an extremely isoplanatic lens through which the recovered beam passes; and
a camera for detecting the recovered beam after the recovered beam has passed through the extremely isoplanatic lens.

6. The holographic storage recovery device or system of claim 3, wherein the extremely isoplanatic lens is decentered.

7. The holographic storage recovery device or system of claim 5, wherein the extremely isoplanatic lens is on axis.

8. A method comprising:
(a) passing a reconstruction beam through a holographic storage medium to thereby form a recovered beam from one or more data pages stored in the holographic storage medium; and
(b) detecting the recovered beam after the recovered beam has passed through an extremely isoplanatic lens.

9. The method of claim 8, further comprising the following step:
(c) storing the one or more data pages in the holographic storage medium.

10. The method of claim 9, wherein step (c) comprises passing a data beam and a reference beam through a storage lens and wherein the extremely isoplanatic lens has fewer lens elements than the storage lens.

11. The method of claim 9, wherein between step (c) and step (b) the holographic storage medium undergoes a total translational shift of half a book width or less and wherein the SNR loss is half a db or less.

12. The method of claim 9, wherein between step (c) and step (b) the holographic storage medium undergoes a total rotational shift of 20% of the system NA and wherein the SNR loss is half a db or less.

13. The method of claim 8, wherein the extremely isoplanatic lens is decentered.

14. The method of claim 8, wherein the extremely isoplanatic lens is on axis.

15. An article comprising:
a holographic storage medium having one or more data pages stored therein, in which the one more data pages stored are obtained by interference of a reference beam and a data beam in the holographic storage medium, wherein the data beam has passed through an extremely isoplanatic lens prior to entering the holographic storage medium, and wherein the holographic storage medium has hot spots of lesser volume and irradiance than the holographic storage medium would have if the one or more data pages were stored using a conventional, diffraction limited, on-axis FT lens.

16. The article of claim 15, wherein the holographic storage medium has a total volume of hot spots that is about 20% to 100 times less than the holographic storage medium would have if the one or more data pages were stored using a conventional, diffraction limited, on-axis FT lens.

17. The article of claim 15, wherein the holographic storage medium has a total volume of hot spots that is about 5 times less than the holographic storage medium would have if the one or more data pages were stored using a conventional, diffraction limited, on-axis FT lens.

18. The article of claim 15, wherein the holographic storage medium has a total irradiance of hot spots that is about 1.5 times to 500 times less than the holographic storage medium would have if the one or more data pages were stored using a conventional, diffraction limited, on-axis FT lens.

19. The article of claim 15, wherein the holographic storage medium has a total irradiance of hot spots that is about 15 times less than the holographic storage medium would have if the one or more data pages were stored using a conventional, diffraction limited, on-axis FT lens.

20. The holographic storage recovery device or system of claim 15, wherein the extremely isoplanatic lens is decentered.

* * * * *